(12) United States Patent
Elliott et al.

(10) Patent No.: US 12,067,614 B2
(45) Date of Patent: *Aug. 20, 2024

(54) SYSTEMS AND METHODS FOR PERFORMING A PURCHASE TRANSACTION USING REWARDS POINTS

(71) Applicant: Capital One Services, LLC, McLean, VA (US)

(72) Inventors: Richard Elliott, Glen Allen, VA (US); Matthew Sextone, Richmond, VA (US); Patricia Hansen, Glen Allen, VA (US); Rhett Edwards, Mechanicsville, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,043

(22) Filed: Nov. 30, 2022

(65) Prior Publication Data
US 2023/0088714 A1    Mar. 23, 2023

Related U.S. Application Data

(63) Continuation of application No. 17/086,626, filed on Nov. 2, 2020, now Pat. No. 11,562,424, which is a
(Continued)

(51) Int. Cl.
*G06Q 30/02* (2023.01)
*G06Q 30/0241* (2023.01)
(Continued)

(52) U.S. Cl.
CPC ............. *G06Q 40/00* (2013.01); *G06Q 30/02* (2013.01); *G06Q 30/0255* (2013.01); *G06Q 30/0267* (2013.01); *G06Q 30/0277* (2013.01)

(58) Field of Classification Search
CPC .... G06Q 40/00; G06Q 30/02; G06Q 30/0255; G06Q 30/0267; G06Q 30/0277
(Continued)

(56) References Cited

U.S. PATENT DOCUMENTS

| 5,923,016 A | 7/1999 | Fredregill et al. |
| 6,138,911 A | 10/2000 | Fredregill et al. |

(Continued)

FOREIGN PATENT DOCUMENTS

| WO | 2005098702 | * 10/2005 | ............. G06Q 20/08 |
| WO | 2005098702 A2 | 10/2005 | |

OTHER PUBLICATIONS

Google Scholar Search, dated May 21, 2022 (Year: 2022).
Google Patents Search, dated May 21, 2022 (Year: 2022).

*Primary Examiner* — Hai Tran
(74) *Attorney, Agent, or Firm* — TROUTMAN PEPPER HAMILTON SANDERS LLP; Christopher J. Forstner; John A. Morrissett

(57) ABSTRACT

A system and method for performing a purchase transaction using rewards points by receiving a purchase request using a financial account with associated account information, determining based on the account information that the financial account is associated with a rewards program with rewards points, and providing the option to pay for the purchase using the financial account or at least a portion of the rewards points. The purchase may be paid for using rewards points from multiple rewards programs and/or multiple financial accounts.

20 Claims, 21 Drawing Sheets

Related U.S. Application Data continuation of application No. 15/949,417, filed on Apr. 10, 2018, now Pat. No. 10,825,087, which is a continuation of application No. 12/106,074, filed on Apr. 18, 2008, now Pat. No. 9,972,047.

(51) Int. Cl.
*G06Q 30/0251* (2023.01)
*G06Q 40/00* (2023.01)

(58) Field of Classification Search
USPC .............................. 705/35–45, 14
See application file for complete search history.

(56) References Cited

U.S. PATENT DOCUMENTS

| | | | |
|---|---|---|---|
| 6,189,787 B1 | 2/2001 | Dorf | |
| 6,594,640 B1 | 7/2003 | Postrel | |
| 6,611,811 B1 | 8/2003 | Deaton et al. | |
| 7,210,620 B2 | 5/2007 | Jones | |
| 7,249,097 B2 | 7/2007 | Hutchinson et al. | |
| 9,842,344 B2 | 12/2017 | Bowman | |
| 2001/0034720 A1 | 10/2001 | Armes | |
| 2001/0054003 A1 | 12/2001 | Chien et al. | |
| 2002/0013728 A1 | 1/2002 | Wilkman | |
| 2002/0032607 A1 | 3/2002 | Kuwahara | |
| 2002/0143614 A1 | 10/2002 | MacLean et al. | |
| 2003/0225615 A1 | 12/2003 | Sumiyoshi | |
| 2003/0225617 A1 | 12/2003 | Sumiyoshi | |
| 2003/0225618 A1 | 12/2003 | Hessburg et al. | |
| 2004/0143544 A1 | 7/2004 | Lilge et al. | |
| 2004/0199421 A1 | 10/2004 | Oda et al. | |
| 2005/0021400 A1* | 1/2005 | Postrel | G06Q 20/3574 705/14.27 |
| 2005/0080727 A1 | 4/2005 | Postrel | |
| 2005/0251446 A1* | 11/2005 | Jiang | G06Q 20/40 235/380 |
| 2006/0004629 A1 | 1/2006 | Neemann et al. | |
| 2006/0027647 A1 | 2/2006 | Deane et al. | |
| 2006/0036483 A1 | 2/2006 | Jang | |
| 2006/0076400 A1 | 4/2006 | Fletcher | |
| 2006/0100935 A1 | 5/2006 | Klawitter et al. | |
| 2006/0259362 A1 | 11/2006 | Cates | |
| 2007/0073574 A1 | 3/2007 | Young, Jr. | |
| 2007/0112668 A1 | 5/2007 | Celano et al. | |
| 2007/0129955 A1 | 6/2007 | Dalmia et al. | |
| 2007/0150411 A1 | 6/2007 | Addepalli et al. | |
| 2007/0156470 A1 | 7/2007 | Granucci et al. | |
| 2008/0059303 A1 | 3/2008 | Fordyce | |
| 2008/0201224 A1* | 8/2008 | Owens | G06Q 30/0236 705/14.15 |
| 2009/0012862 A1 | 1/2009 | Pirillo et al. | |
| 2016/0098739 A1* | 4/2016 | Bowman | G06Q 30/0226 705/14.18 |

\* cited by examiner

FIG. 7

ITEM: BOOK ↙201
PRICE: $47.50 ↙202

FIRST NAME [ ] ↙203
LAST NAME [ ] ↙204
STREET ADDRESS [ ] ↙205
CITY [ ] ↙206
STATE [ ▼] ↙207
ZIP CODE [ ] ↙208

CARD TYPE [ Visa ▼] ↙209
CARD NUMBER [ ] ↙210
EXPIRATION DATE [ ] ↙211
CARD IDENTIFICATION NUMBER [ ] ↙212

[ PURCHASE ITEM ] ↙213

ITEM: BOOK ⌒201
PRICE: $47.50 ⌒202

FIRST NAME [ John ] ⌒203
LAST NAME [ Doe ] ⌒204
STREET ADDRESS [ 11 Main Street ] ⌒205
CITY [ Anytown ] ⌒206
STATE [ VA ▼ ] ⌒207
ZIP CODE [ 12345 ] ⌒208

CARD TYPE [ Visa ▼ ] ⌒209
CARD NUMBER [ XXXX-XXXX-XXXX-1234 ] ⌒210
EXPIRATION DATE [ 01/09 ] ⌒211
CARD IDENTIFICATION NUMBER [ 789 ] ⌒212

WOULD YOU LIKE TO PAY FOR THIS PURCHASE WITH 47,500 FREQUENT FLYER MILES FROM YOUR ABC AIRLINE REWARDS ACCOUNT INSTEAD? ⌒214

OR

PURCHASE ITEM WITH VISA CARD ⌒216

[ YES ] ⌒215

ITEM: BOOK ⌣301
PRICE: $47.50 ⌣302
NUMBER: 987xyz654321 ⌣303

304

You can use rewards points to buy this item!

You currently have 50,000 frequent flyer miles available ⌣305
in your ABC Airline Rewards Account.

| BUY WITH 47,500 MILES | ⌣306 |

| BUY WITH YOUR VISA CARD | ⌣307 |

Your Rewards Wallet – John Doe

| Program Name: | Program Number: | Points Available: | Points Allocated: |
|---|---|---|---|
| First Bank | xxxx-xx-3432 | 100 points | 100 |
| First Bank | xxxx-xx-8893 | 823 points | 400 |

Total points needed to pay for purchase: 719

Total points allocated so far: 500

Points needed: 219

COMPLETE PURCHASE

FIG. 12

Your Rewards Wallet – John Doe (601)

You need 12,725 points to complete this transaction. (602)

| Program Name: (603) | Program Number: (604) | Points Available: (605) | Points Allocated: (606) |
|---|---|---|---|
| First Bank | xxxx-xx-3432 | 36,000 | 1,000 |
| Second Bank | xxxx-xx-9943 | 20,463 | 11,725 |
| | | Total: | 12,725 (607) |

COMPLETE TRANSACTION (608)

FIG. 13

Your Rewards Wallet – John Doe

You need 12,725 points to complete this transaction.

| Program Name: | Program Number: | Points Available: | Points Allocated: |
|---|---|---|---|
| First Bank | xxxx-xx-3432 | 36,000 | 5,000 |
| Second Bank | xxxx-xx-9943 | 20,463 | 7,725 |
| | | Total: | 12,725 |

COMPLETE TRANSACTION

FIG. 14

Your Rewards Wallet – John Doe

| Program Name: | Program Number: | MIN | Points: | MAX | Allocated: |
|---|---|---|---|---|---|
| First Bank | xxxx-xx-3432 | 0 pts | | 12,000 pts | 0 pts |
| Second Bank | xxxx-xx-9943 | 0 pts | | 500 pts | 100 pts |
| First Airlines | 1XX4839 | 0 miles | | 17 miles | 17 miles |
| First Hotel Chain | BB4d33 | 100 pts | | 248 pts | 190 pts |
| Credit Card on File: | xxx-xx-3432 | $0.00 | | $247.52 | $0.00 |
| | | | TOTAL | | $247.52 |

COMPLETE TRANSACTION

FIG. 19

| 900 | | Customer Accounts Data | | | |
|---|---|---|---|---|---|
| | | | 909 | 910 | 911 | 912 |
| 901 | Entry Number | 1 | 2 | 3 | 4 |
| 902 | Name | John Doe | | | |
| 903 | Address | 11 Main St. | | | |
| 904 | Phone Number | (123) 456-7890 | | | |
| 905 | Account Number | 1234 1234 1234 1234 | | | |
| 906 | Identifier | 123412 | | | |
| 907 | Expiration Date | 1/1/09 | | | |
| 908 | Account Preferences | None | | | |

FIG. 20

| | Rewards Program Participation Data | | | | |
|---|---|---|---|---|---|
| Entry Number | 1 | 2 | 3 | 4 |
| Identifier | 123412 | | | |
| Rewards Program Name | "ABC Rewards" | | | |
| Rewards Program Provider | ABC Airline | | | |
| Rewards Program Identifier | 012ABC345DEF | | | |
| Rewards Program Type | Miles | | | |

FIG. 21

| | Rewards Information Data | | | | |
|---|---|---|---|---|---|
| | | | 960 | 961 | 962 | 963 |
| 951 — | Entry Number | 1 | 2 | 3 | 4 |
| 952 — | Customer Name | John Doe | | | |
| 953 — | Account Number | 1234 1234 1234 1234 | | | |
| 954 — | Rewards Program Name | "ABC Rewards" | | | |
| 955 — | Rewards Program Provider | ABC Airline | | | |
| 956 — | Points Accumulated | 12,500 miles | | | |
| 957 — | Cash Value Equivalent | $125.00 | | | |
| 958 — | Conversion Data | 100:1 | | | |
| 959 — | Redemption Restrictions | > 20,000 miles | | | |

950

SYSTEMS AND METHODS FOR PERFORMING A PURCHASE TRANSACTION USING REWARDS POINTS

CROSS REFERENCE TO RELATED APPLICATIONS

This application is a continuation of, and claims priority under 35 U.S.C. § 120 to, U.S. patent application Ser. No. 17/086,626, filed Nov. 2, 2020, which is a continuation of U.S. patent application Ser. No. 15/949,417, now U.S. Pat. No. 10,825,087, filed Apr. 10, 2018, which is a continuation of U.S. patent application Ser. No. 12/106,074, filed Apr. 18, 2008, now U.S. Pat. No. 9,972,047, the entire contents of each of which are fully incorporated herein by reference.

FIELD OF THE INVENTION

The present inventions relate to systems and methods for purchases using rewards points.

BACKGROUND OF THE INVENTION

Numerous financial institutions and other entities offer membership rewards programs whereby participants may receive "points" for performing various actions, such as purchasing goods and services from a particular merchant or using a particular transaction card. Customers often, however, accumulate rewards points in multiple rewards programs that they may be unable or unwilling to redeem in the ways required by the provider. For example, an airline carrier offering a rewards program may require that a large number of frequent flyer miles be accrued before the participant can earn a free flight. Customers also often accumulate a small number of rewards points distributed across many different rewards programs, which are not readily redeemable. These customers may lack a way to use their rewards points as currency and to combine rewards points from multiple programs with cash from their various accounts.

These and other drawbacks exist with current systems.

SUMMARY OF THE INVENTION

Various exemplary embodiments provide for performing a purchase transaction using rewards points.

Many customers have accounts that they use to conduct financial transactions in various ways. Online credit card purchases are just one well-known example. It is also well-known that financial institutions, merchants, and other entities regularly offer membership rewards programs to their customers whereby customers can accumulate points in the rewards program by purchasing items over time. For instance, a credit card provider may give its customers a certain number of points or frequent flyer miles for every purchase they make using their credit cards. Such rewards points, however, may only be redeemed in certain circumstances according to terms set by the provider. For example, the customer may need to accumulate a large amount of rewards points or may be limited to just certain rewards offered by the provider. It would therefore be very beneficial if customers could simply use their rewards points as currency to purchase any items that they choose.

In one illustrative example, a customer may request a particular purchase and provide account information to pay for the transaction, such as a credit card number. Based on the provided information, the merchant may determine that the customer belongs to a certain rewards program. For example, the customer may have accumulated a certain number of points that, when converted to their cash equivalent, would cover the value of the purchase. To find out whether the customer has a rewards program, the computer system may request and receive information from the provider of the program or another entity. It may also retrieve such information internally. If the computer system determines that the customer has a rewards program with rewards points available, it may then present the customer with the option to pay for the purchase with the rewards points rather than the account that was provided. Then, if the customer selects the option to pay with the rewards points, the merchant computer system may notify the provider, provide the purchased item to the customer, and later receive payment for the value of the rewards points that were redeemed.

In another illustrative example, the computer system may store information for the customer ahead of time so that the customer does not need to input information with the purchase request. For example, a customer may pre-register his or her credit card numbers and rewards programs with a merchant computer system. When the customer later desires to make a purchase, the merchant computer system may present the option of paying with the preregistered rewards points or accounts.

In another illustrative example, the merchant computer system may provide the customer with the option to "split" the purchase price of an item and buy it using rewards points from multiple programs, cash from multiple accounts, or combinations of both. For example, if the price of an item is $50, the customer may choose to pay for the item with 100 points corresponding to $10, 2500 frequent flyer miles corresponding to $25, and $15 cash from a credit card. The merchant computer system may perform various calculations to convert between rewards points and cash values. The merchant computer system may also communicate with various rewards program providers and account providers to ensure the correct flow of payments.

In another illustrative example, the merchant computer system may provide an interactive user interface for the customer to choose among various rewards points and/or accounts. The user interface may comprise various allocations that dynamically change in response to input from the customer. For example, if the customer increases the number of rewards points from a particular program, the number of rewards points from another program may correspondingly decrease. In that way, the customer may make a more informed decision about how to spend his or her rewards points and cash.

In another illustrative example, an aggregator computer system may store information for the customer's various rewards programs and accounts and the merchant computer system may communicate with that system to provide the option to the customer.

In another illustrative example, a rewards program may be provided by an account provider and the merchant computer system may communicate with the account provider using well-known authorization and settlement procedures. For example, a merchant processor and card association may relay communications between the two systems.

Other embodiments are also within the scope of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which:

FIG. 7 depicts an exemplary user interface for requesting a purchase according to various embodiments of the disclosure;

FIG. 8 depicts an exemplary user interface with the option to pay with rewards points or an account according to various embodiments of the disclosure;

FIG. 11 depicts an exemplary user interface with the option to pay with rewards points from multiple rewards programs displaying rewards points according to various embodiments of the disclosure;

FIG. 12 depicts an exemplary user interface with the option to pay with rewards points from multiple rewards programs displaying text rewards points allocations according to various embodiments of the disclosure;

FIG. 13 depicts an exemplary user interface with the option to pay with rewards points from multiple rewards programs displaying text rewards points allocations according to various embodiments of the disclosure;

FIG. 14 depicts an exemplary user interface with the option to pay with rewards points from multiple rewards programs displaying visual rewards points and account allocations according to various embodiments of the disclosure;

FIG. 19 depicts exemplary customer accounts data according to various embodiments of the disclosure;

FIG. 20 depicts exemplary rewards program participation data according to various embodiments of the disclosure; and FIG. 21 depicts exemplary rewards information data according to various embodiments of the disclosure.

DETAILED DESCRIPTION OF EXEMPLARY EMBODIMENT(S)

Figure 1:
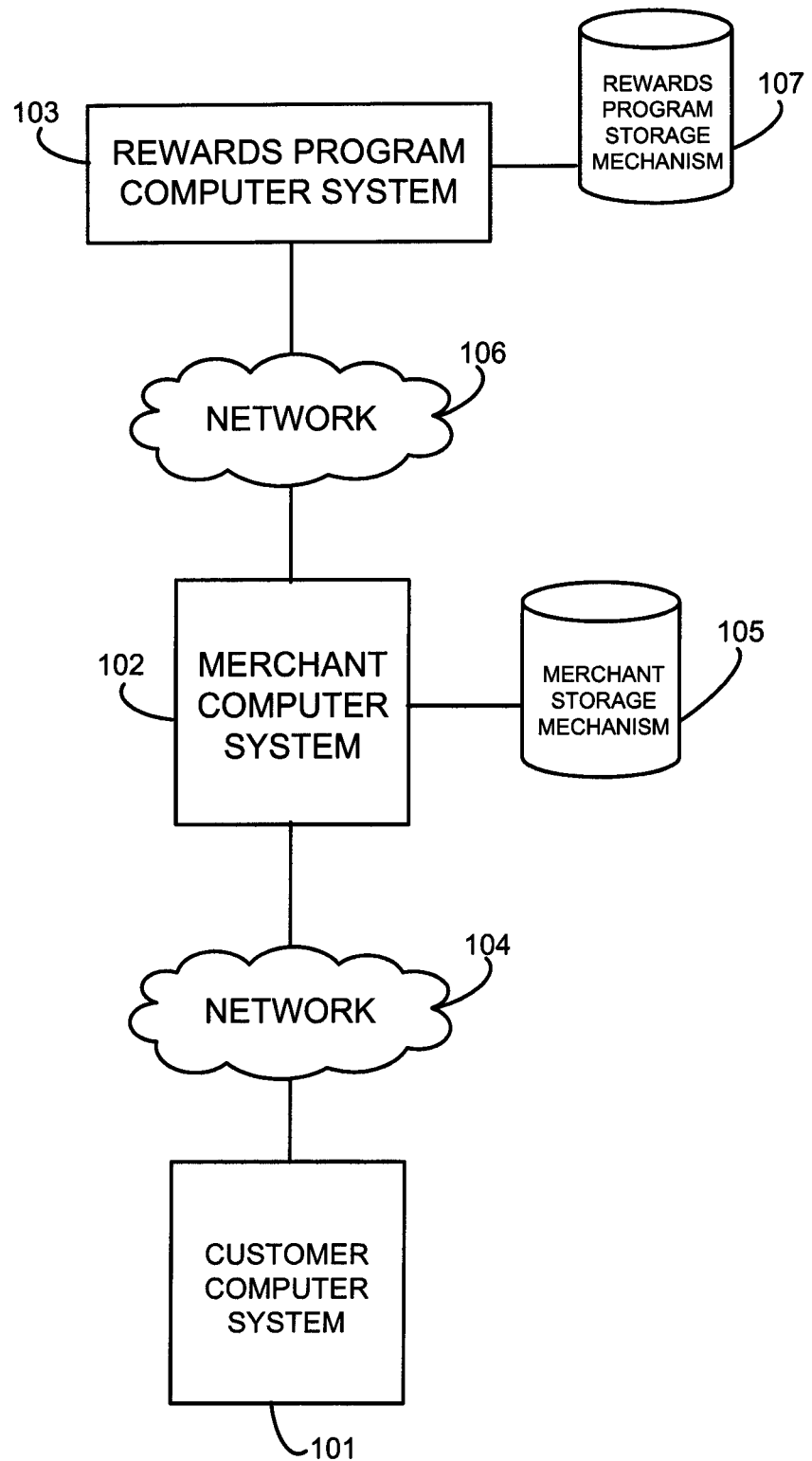
FIG. 1 depicts an exemplary system for performing a purchase transaction using rewards points according to various embodiments of the disclosure.

The following description is intended to convey a thorough understanding of the embodiments described by providing a number of specific embodiments and details involving systems and methods for performing a purchase transaction using rewards points. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Numerous financial institutions, such as credit card companies and banks, as well as other entities like airline carriers, hotels, and retailers, offer membership rewards programs (also known as "loyalty programs"). These programs may reward participants with rewards "points," such as numerical points or airline miles, for various activities, such as purchasing merchandise or services from merchants using a qualified account, such as a debit or credit account. For example, a participant in a rewards program may use a transaction card associated with the qualified account and be rewarded with a corresponding number of points for using the card. A merchant may also administer its own rewards program whereby customers can accumulate points on items they buy from the merchant. Other programs may offer other types of rewards, incentives, or the like. For example, some rewards programs may return to a participant a predetermined percentage of a transaction amount or of an amount spent during a predetermined period (referred to as "cash back") either as a credit to an account or by check. Others may offer participants discounts or coupons on select merchandise or services and/or provide complimentary merchandise or services. As used herein, the term rewards points may include any unit or currency of rewards accumulated in a rewards program, including, for example and without limitation, points, bonus points, club points, and airline miles. Rewards points may also include cash in any form accumulated in a rewards program.

Rewards points may accrue at a rate specified by the entity providing the rewards program. For example, a participant may earn one point for every dollar spent using a particular account or may receive one frequent flyer mile for every mile traveled on a qualified flight. Some entities may restrict purchasing to particular merchants to earn rewards points, whereas other entities may have no such restrictions. The maximum rewards points a participant can earn annually may be unlimited or the provider may set specific limits. Additionally, rewards points may not accumulate on cash advances, convenience checks, balance transfers, fees, or adjustments, depending on the provider of the rewards program, for example. When merchandise purchased with a respective account is returned, the account credit may also result in a reduction of rewards points.

Various restrictions may also be placed on a rewards program such that rewards points may only be "redeemed" for certain rewards at certain times and under certain conditions. Rewards program participants may need to accumulate a certain amount of rewards points over time to be able to redeem the points for merchandise or services. For example, a participant may need a certain number of rewards points to receive a desired reward or a certain number of frequent flyer miles to receive a free flight. Depending on the program, only certain merchants may be considered qualified merchants with whom rewards points may be redeemed toward a purchase (e.g., a merchant offering a rewards program may prohibit its points from being used to buy an item from a competitor). Other types of rewards points may be used for any purchase. Rewards points may also expire if they are not redeemed within a designated period of time. A participant may be notified of any such conditions or restrictions in advance. Also, any entity involved in the accrual or redemption of rewards points may place conditions or restrictions on the redemption of those points.

It will be understood by those of ordinary skill in the art that an amount of rewards points may have a corresponding cash equivalent value for which the rewards points may be redeemed. For example, 100 rewards points may be "worth" one dollar or 1000 airline miles may be "worth" 50 dollars. The ratio of rewards points to cash (e.g., 100 rewards points for one dollar) may be set by any entity associated with the rewards program, such as the rewards program provider or the merchant with which the customer is attempting to redeem his or her points. The cash equivalent of rewards points may also differ depending on how the participant chooses to redeem the points. For example, the participant may receive $50 by simply exchanging points for cash or may instead receive a $100 discount on the participant's next qualifying purchase. In that way, a merchant offering a rewards program may encourage its customers to buy more in the future and thereby increase its sales.

It will also be recognized that a customer may accumulate small amounts of rewards points in multiple rewards programs that he or she is not readily able to redeem for various reasons. For example, a customer may decide to register with one airline's rewards program for just one flight and receive 100 frequent flyer miles, but the airline may require 100,000 miles in order to receive any type of reward, such as a free flight. A customer may also have rewards points that are about to expire or may be unaware of rewards points in the many different rewards programs in which he or she is participating. In these ways, the customer may miss valuable opportunities to redeem rewards points that he or she accumulated over time. Providing a mechanism for rewards redemption in such situations may benefit the customer by giving the customer value for rewards points that might otherwise have been overlooked. It may also encourage loyalty to the rewards program provider and/or merchant with which the customer redeems his or her points.

Customers also may be unable to redeem rewards points in another similar scenario. Specifically, a customer may have accumulated a small amount of points in one rewards program and a small amount of points in another rewards program, which by themselves are not redeemable. However, by combining the two sets of rewards points, the customer may have enough to buy a product or service that he or she desires. Providing a mechanism for rewards redemption in these circumstances, particularly at the point of sale for the customer, may benefit the customer as well.

FIGS. 1 through 6 depict exemplary embodiments of systems for performing a purchase transaction using rewards points according to various embodiments of the disclosure. The systems may involve various network-enabled computer systems to process instructions for performing a purchase transaction using rewards points, including, as depicted in FIG. 1, for example, a customer computer system 101, a merchant computer system 102, and a rewards program computer system 103. As referred to herein, a network-enabled computer system may include, but is not limited to: e.g., any computer device, or communications device including, e.g., a server, a network appliance, a personal computer (PC), a workstation, a mobile device, a phone, a handheld PC, a personal digital assistant (PDA), an automated teller machine ("ATM"), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the performance of a purchase transaction using rewards points, as described herein.

The components depicted in FIGS. 1 through 6 may store information in various electronic storage media, such as, for example, a rewards program storage mechanism 107 and a merchant storage mechanism 105 depicted in FIG. 1. It is well-known in the art that electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIGS. 1 through 6 may be coupled via one or more networks. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In various exemplary embodiments, a network may include one, or any number of the exemplary types of networks mentioned above, operating as a stand alone network or in cooperation with each other. Use of the term network herein is not intended to limit the network to a single network. The components depicted in FIGS. 1 through 6 may communicate by electronic transmission through the one or more networks mentioned above, by physical delivery, or by any other communication mechanism. Communication between two components depicted in FIGS. 1 through 6 may also include communication with any other entities between the two components.

In various exemplary embodiments, customer computer system 101 may be a computer system associated with or operated by a customer, e.g. an individual or entity that desires to conduct a purchase transaction. The customer may, for example, desire (at least initially) to conduct a purchase transaction using an account with an account provider. As used herein, the term account may include any place, location, object, entity, or other mechanism for holding money or performing monetary transactions in any form, including, without limitation, electronic form. An account may be, for example, a prepaid card account, stored value card account, debit card account, check card account, payroll card account, gift card account, prepaid credit card account, charge card account, checking account, rewards account, line of credit account, credit account, mobile device account, or mobile commerce account. An account provider may be, for example, a bank, other type of financial institution, or any other entity that offers accounts to customers. An account may or may not have an associated card, such as, for example, a credit card for a credit account.

The customer associated with customer computer system 101 may conduct financial transactions with one or more merchants using his or her account. For example, the customer may desire to purchase goods or services from a merchant. To do so, the customer may use a unique account identifier associated with the customer's account, which may be any sequence of letters, numbers, characters, or symbols of any length associated with a payment mechanism, including, without limitation, a credit card, debit card, smart card, charge card, or any other mechanism for making payment. The payment mechanism may be issued to the customer by the corresponding account provider. For example, the customer may be issued a credit card that allows the customer to make purchases on credit up to a specified dollar limit and repay the account provider for those purchases over time by making monthly payments. The account provider may pay for the purchases of the customer at the time of purchase on behalf of the customer and charge the customer interest for using its credit services. Also, the customer may use a charge card wherein the balance of the customer's card may be paid off monthly or a debit card wherein amounts for the customer's purchases may be electronically debited from a checking or other account held by the customer with the account provider.

To make a purchase, the customer may, for example and without limitation, swipe his or her credit card in person at the location of a merchant using a register, card payment terminal, ATM, or point of sale (POS) system, which may read the account identifier from the magnetic stripe on the card. Also, the account identifier may be provided via a bar code on the card. Also, the customer may provide a merchant with the account identifier over the telephone using a Voice Response Unit (VRU). Also, the account identifier may be provided via radio-frequency identification (RFID), near field communication (NFC), or other automatic identification mechanisms. Also, an account identifier may be associated with biometric information provided by a customer (e.g., fingerprint, iris scan, signature, voice). Various mechanisms for accepting an account identifier as payment will be recognized by those skilled in the art, including, for example, transaction processing equipment and software provided by, for example, VeriFone, Inc. of San Jose, California.

The customer may also initiate a purchase transaction electronically using customer computer system 101. Customer computer system 101, which may be, for example and without limitation, a personal computer or wireless/mobile device running a web browser program, may communicate with merchant computer system 102 by electronic transmission over network 104, such as the Internet. A web browser program on customer computer system 101 may connect to a server of merchant computer system 102 and request the Uniform Resource Locator (URL) of a web page from the server. The server may receive the request, process the request, retrieve or create the requested web page (e.g., a web page showing the item to be purchased, a price, and a choice of payment mechanisms), and transmit the requested web page to customer computer system 101. The web browser program may receive the web page and render it on a monitor or screen. The customer may then interact with the web page by, for example, clicking on buttons or activating links associated with the web page or entering information with a keyboard. The web browser program may interpret this interaction and send information back to the server to perform various actions as instructed by the customer. For example, the customer may enter his or her account identifier and/or other information associated with the desired purchase on the web page and click a button to initiate the purchase. Examples of commercial web browser programs suitable for this purpose are Internet Explorer available from Microsoft® Corporation, Safari® available from Apple®, Inc., and Firefox® available from Mozilla Corporation. The web pages described above may be, for example, HTML (Hypertext Markup Language), XML (Extensible Markup Language), ASP (Active Server Page), Java, Javascript, XHTML (Extensible HyperText Markup Language), or Ajax (Asynchronous JavaScript and XML) files, or any other file format that allows web pages or portions of web pages to be rendered in a web browser. It will be recognized by those skilled in the art that various tools are readily available to create and render web pages.

Various other mechanisms for conducting financial transactions will be recognized by those skilled in the art. Items may be purchased by charging an amount to a mobile device, such as a cellular phone, PDA, or smart phone, using various known mechanisms for mobile commerce (otherwise known as "m-commerce"). For example, a customer may use a software application on a mobile device to charge from the mobile device's account or pre-loaded RFID chip. Also, various alternative payment services may be utilized, such as, for example, PayPal, PayPal Mobile, Obopay, and Google Checkout. These services may be accessed from the customer computer system and allow the customer to pay for a transaction or transfer money in various ways without using his or her sensitive financial information, such as credit card numbers.

It will also be understood that although a purchase transaction is described herein, any type of financial transaction may be performed, such as, for example, a purchase, charge, cash advance, cash withdrawal, loan, payment, bill payment, check, debit, credit, deposit, or direct deposit. It will further be recognized that the systems for using rewards points to conduct financial transactions, as described in further detail below, may be provided in conjunction with any mechanism described above.

The customer associated with customer computer system 101 may choose to participate in a rewards program provided by a rewards program provider, which may operate or be associated with rewards program computer system 103. As described above, the customer may accumulate rewards points by making qualifying purchases, performing other financial transactions, or engaging in any other activity. It will be recognized that any entity or individual may operate a rewards program and associated rewards program computer system 103. For example, an account provider may issue a credit card with an associated rewards program. The participating customer may then earn rewards points on purchases that he or she makes using the card (e.g., 100 points for every dollar spent). The account provider may also be a bank and may reward its customers with rewards points for Automated Clearing House (ACH) transactions that they conduct using the bank's routing number and their account numbers. Also, the rewards program provider may be a retail or entertainment merchant that rewards its customers for loyalty purchases. A customer in that situation may earn points (e.g., 10% off coupon for every $100 spent) by, for example, swiping a club card every time he or she makes a purchase at one of the merchant's retail locations. Rewards points may also be accumulated for purchases without any link to a card. Also, the rewards program may be a frequent flyer program operated by an airline carrier. A customer in that situation may earn frequent flyer miles by using an identifier (e.g., account number, rewards code) every time he or she purchases a flight from the carrier. Also, the rewards program provider may be a consumer packaged goods manufacturer. For example, a customer may register with the entity (e.g., a beverage manufacturer) and accumulate rewards points by entering on a web page codes that are printed on the retail products that he or she purchases (e.g., a numerical code printed on each bottle cap of a soft drink that the customer purchases). The rewards program provider may be any other entity as well.

It will be recognized that any type of account or other payment mechanism may be associated with a rewards program. Such payment mechanisms may include, for example and without limitation, transaction cards, transaction cards capable of communicating via RFID or NFC, alternative payment service providers like PayPal, Obopay, and Google Checkout, biometric payment service providers, and mechanisms using alternative payment networks, such as wireless service providers.

In various exemplary embodiments, a mechanism may be provided whereby a customer may use rewards points that he or she has accumulated over time to purchase products and services. As described in reference to FIG. 1, customer computer system 101 may first request to make a purchase from the merchant associated with merchant computer system 102 by, for example, the customer clicking on a web page of the merchant and the customer's web browser program providing the request to the merchant's server over network 104. Also, the customer may request to transfer money or make a purchase using a mobile device. The purchase request may include information regarding the customer and his or her desired method of payment (e.g., an account identifier). For example, the customer may enter his or her credit card number on a web page. Also, the customer may have already provided such information to merchant computer system 102 prior to making the purchase request. For example, the customer may have previously registered his or her credit card number with merchant computer system 102 via a web page submission or telephone call. In that scenario, the web page provided by merchant computer system 102 may allow the customer to simply select the previously registered account number rather than inputting a new payment mechanism. The storage of customer account information will be described in reference to FIG. 2.

Figure 2:
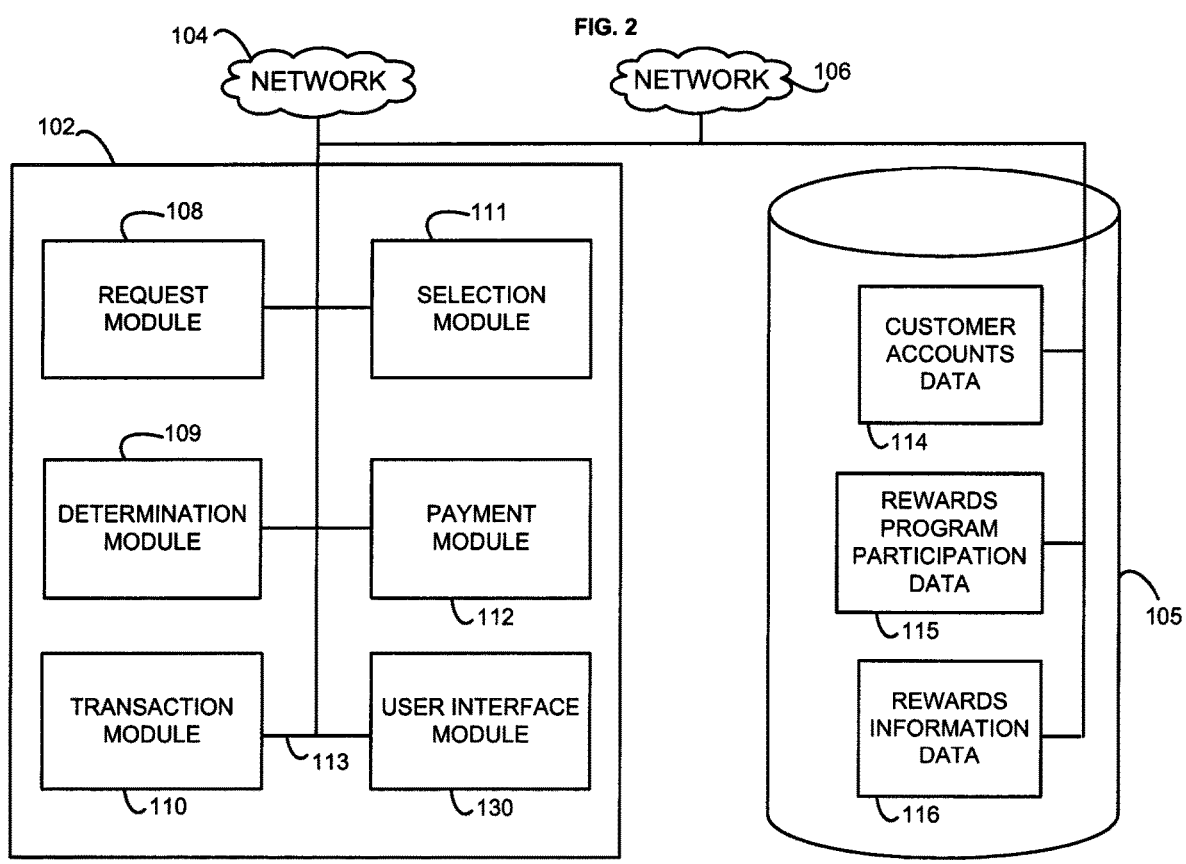
FIG. 2 depicts an exemplary merchant computer system according to various embodiments of the disclosure.

FIG. 2 depicts an exemplary merchant computer system 102 and merchant storage mechanism 105 for performing a purchase transaction using rewards points according to various embodiments of the disclosure. Merchant computer system 102 may include one or more of the following modules: a request module 108, a determination module 109, a transaction module 110, a selection module 111, a payment module 112, and a user interface module 130. One or more of the modules may electronically communicate with each other and/or other entities via a communication mechanism 113, such as a data communication bus or one or more external networks as defined herein, including network 104 and network 106. The modules may each be a computer program or an appropriately programmed computer, such as a mainframe or personal computer, or may include a plurality of such computers cooperating to perform the functionality described herein. The modules may also communicate with merchant storage mechanism 105, which may include customer accounts data 114, rewards program participation data 115, and rewards information data 116, as described herein.

Merchant computer system 102 may store the customer's account information as customer accounts data 114 either at the time of purchase (if provided with the purchase request) or prior to the purchase (if the customer registers beforehand). Customer accounts data 114 may store, for example, customer names, addresses, phone numbers, account identifiers, account numbers, account expiration dates, and any other information associated with an account held by a customer. Customer accounts data 114 may be stored in merchant storage mechanism 105 or may be stored in any other storage mechanism associated with or remote to merchant computer system 102. In various exemplary embodiments, an account identifier may comprise a bank identification number (BIN), which may be a six digit prefix of a credit card number or debit card number. A BIN may be used to identify the account provider for the associated account (or another entity, such as a card association), as well as to determine the type of account. As described in greater detail below, a BIN (or any other identifier associated with the customer and/or an account held by the customer) may be used to determine if the customer has any associated rewards program(s).

FIG. 19 depicts exemplary customer accounts data. Customer accounts data 900 may comprise entries 909-912 for particular stored customer accounts, as described herein, wherein each is given an entry number 901. For example, entry 909 may correspond to an account held by the customer "John Doe." Each entry may comprise information associated with a particular account and customer, such as customer name 902, address 903, phone number 904, account number 905, identifier 906, expiration date 907, and account preferences 908. Identifier 906 may be the BIN for each stored account. For example, entry 909 may correspond to an account with an account number of 1234123412341234 and BIN of 123412 (i.e., the first six digits). Account preferences 908 may store various account preferences set by the customer (e.g., to receive periodic updates from the merchant with information about new products, preferences for an account screen user interface).

Returning to FIG. 2, request module 108 may receive a purchase request for a purchase using a particular account. Determination module 109 may then determine whether the account is associated with a rewards program with accumulated rewards points. To do so, merchant computer system 102 may access rewards program participation data 115. Rewards program participation data 115 may include various account numbers or identifiers (e.g., BINs) and an indication as to what rewards program they are associated with (if any). For example, the indication may be a rewards program name or identifier. Rewards program participation data 115 may be stored in merchant storage mechanism 105 or may be stored in any other storage mechanism associated with or remote to merchant computer system 102.

FIG. 20 depicts exemplary rewards program participation data. Rewards program participation data 920 may comprise entries 909-912 for particular stored identifiers (e.g., BINs) and associated lookup information, as described herein, wherein each is given an entry number 921. For example, entry 927 may correspond to the identifier "123412," which may be a BIN in various exemplary embodiments. Each entry may comprise lookup information, such as identifier 922, rewards program name 923, rewards program provider 924, rewards program identifier 925, and rewards program type 926.

It will be recognized that any type of identifier may be used to determine if the customer has any associated rewards program(s). The identifier may be associated with a payment type, such as a credit card or debit card. In various exemplary embodiments, the identifier may be a BIN or full sixteen digit credit card number. The identifier may also be information associated with a customer but not a particular payment type (e.g., a customer name). For example, in the consumer packaged goods manufacturer example described above, a customer may participate in a rewards program and accumulate rewards points by notifying the manufacturer of the products that he or she purchases (e.g., beverages). The customer may use some identifier, such as an e-mail address, username, or customer code, to enter product codes onto a web page and/or redeem accumulated rewards points, for example. In that case, the identifier, as well as any associated customer information, may be provided to merchant computer system 102 by the rewards program provider (e.g., the beverage manufacturer), the customer, a trusted third party, or any other entity with access to such information. Merchant computer system 102 may store the information as rewards program participation data 115.

Again returning to FIG. 2, if merchant computer system 102 determines that the provided identifier (e.g., BIN) has no associated rewards program (e.g., there is no corresponding entry in rewards program participation data 115), it may complete the customer's desired purchase transaction as requested (e.g., through well-known authorization and settlement procedures for credit cards). If, however, the provided identifier (e.g., BIN) has one or more associated rewards programs (e.g., there is at least one corresponding entry in rewards program participating data 115), transaction module 111 may provide the option to pay for the transaction with the provided account or with rewards points accumulated in the associated rewards program. To do so, merchant computer system 102 may retrieve information from rewards information data 116. Rewards information data 116 may store the name of the customer's rewards program, the name of the rewards program provider, the number of points accumulated, the cash value equivalent of those points, a conversion ratio for converting between rewards points and cash, and any other information associated with the rewards program or accumulated rewards points that may be helpful in providing the option described above. Rewards information data 116 may be stored in merchant storage mechanism 105 or may be stored in any other storage mechanism associated with or remote to merchant computer system 102.

FIG. 21 depicts exemplary rewards information data. Rewards information data 950 may comprise entries 960-963 for particular rewards points entries, as described herein, wherein each is given an entry number 951. For example, entry 960 may correspond to the rewards points that customer John Doe accumulated in the "ABC Rewards" program. Each entry may comprise rewards information, such as customer name 952, account number 953, rewards program name 954, rewards program provider 955, points accumulated 956, cash value equivalent 957, conversion data 958 (e.g., a 100:1 conversion ratio), and redemption restrictions 959. As depicted in FIG. 20, customer John Doe may have accumulated 12,500 frequent flyer miles, which may correspond to $125.00 (100:1 conversion ratio), and may not be able to redeem his points until he has accumulated more than 20,000 miles. In various exemplary embodiments, conversion data associated with a particular rewards program may be a simple ratio or percentage for converting between rewards points and cash. It may also be a more complicated formula set by the rewards program provider or another entity. Also, conversion data may be any information used to convert between one "currency" and another, whether "hard" currency (e.g., dollars, euros, pounds, yen) or currency used by any rewards program provider (e.g., points, miles, bottle cap codes). Also, conversion data, such as a ratio, may change over time and may be subject to various conditions and restrictions. For example, a rewards program provider may run a promotion whereby customers may redeem rewards points at a more favorable ratio for a limited period of time.

It will be recognized that although exemplary customer accounts data, rewards program participation data, and rewards information data are depicted in FIGS. 19 through 21, any type of data format or storage mechanism may be used.

Returning to FIG. 2, merchant computer system 102 may process and provide rewards information to customer computer system 101 in various ways. Merchant computer system 102 may also calculate the number of rewards points necessary to buy the requested item using conversion data, as described above, and display that information as well. For example, merchant computer system 102 may calculate the amount of rewards points that are the cash equivalent of a purchase amount based on a ratio or formula in the conversion data and display that information to the customer. Merchant computer system 102 may also determine whether any restrictions or conditions should apply to the use of rewards points to make a purchase, as described above, and display that information or restrict a transaction accordingly. It will also be understood that while merchant computer system 102 is described herein as determining whether the customer has an associated rewards program and retrieving rewards information for the customer's rewards points, similar actions may also be performed by the customer computer system 101. For example, customer computer system 101 may be associated with its own storage mechanism for storing customer accounts data, rewards program participation data, and/or rewards information data. In that way, a customer may accumulate points on his or her own computer system and communicate data to and from other systems, such as merchant computer system 102 and rewards program computer system 103, as necessary.

Figure 9:
FIG. 9 depicts an exemplary user interface with the option to pay with rewards points or an account according to various embodiments of the disclosure.

Providing the option to pay with rewards points will be further described in reference to FIGS. 7 through 9. FIG. 7 depicts an exemplary user interface 200 for requesting a purchase, which may be provided to customer computer system 101 by user interface module 130 of merchant computer system 102. User interface 200 may be, for example, an interactive web page displayed on a screen of customer computer system 101 from web page data provided by merchant computer system 102. User interface 200 may include an item description 201 for the item that the customer desires to purchase, a price 202 for the item, and inputs for the customer's first name 203, last name 204, street address 205, city 206, state 207, and zip code 208. User interface 200 may also include payment inputs associated with a transaction card (e.g., credit or debit card) that the customer may use as payment, including inputs for card type 209, card number 210, expiration date 211, and card identification number 212. The customer may input information into user interface 200 with a keyboard or mouse and click purchase button 213 to purchase the desired item with a card. The inputted information may then be provided by customer computer system 101 to merchant computer system 102 electronically. Merchant computer system 102 may then process the information by determining whether the provided account has an associated rewards program with rewards points, as described herein, and provide the option to pay for the transaction with the account or with rewards points.

FIG. 8 depicts exemplary user interface 200 with the option to pay with rewards points or an account, after the customer has inputted and submitted the required information (e.g., card number, expiration date). Merchant computer system 102 may then return data to customer computer system 101 to modify user interface 200 to allow the customer to choose to pay for the transaction with rewards points instead. As depicted in FIG. 8, an option description 214 reads: "Would you like to pay for this purchase with 47,500 frequent flyer miles from your ABC Airline Rewards Account instead?" Merchant computer system 102 may have therefore determined, as described herein, that the account listed in card number input 210 has an associated frequent flyer miles program with ABC Airline with accumulated rewards points and that $47.50 corresponds to 47,500 in frequent flyer miles. A rewards points selector button 215 may be clicked on the customer's computer screen to pay for the purchase with rewards points. Also, the customer may click on purchase button 216 to purchase the item with the inputted account instead.

It will be recognized that user interface 200 may be one or more interactive web pages downloaded and displayed on a personal computer or mobile device, for example, or any other mechanism for displaying and receiving information for performing a purchase transaction using rewards points. For example, user interface 200 may comprise a popup window, Windows ActiveX control, or Java applet displayed on the customer's computer screen, which allows the customer to select to pay with rewards points or an account. Also, user interface 200 may be directly integrated with an existing e-commerce platform such that any customer that uses the platform may pay with rewards points or an account using the platform. Also, a rewards program provider may provide to the merchant an application programming interface (API) with functionality for determining whether an account has an associated rewards program and presenting such information to the customer. Also, user interface 200 may be displayed on an ATM.

Also, user interface 200 may be integrated and deployed with various alternative payment service providers, such as PayPal, Obopay, and Google Checkout. In that case, merchant computer system 102 may communicate with an alternative payment service provider computer system, which may itself provide user interface 200 to customer computer 101. Also, the alternative payment service provider computer system may communicate information to merchant computer system 102 so that merchant computer system 102 can allow customers to pay for purchases with rewards points via the alternative payment service provider. For example, merchant computer system 102 may communicate with the alternative payment service provider computer system prior to a customer's purchase to establish the functionality for allowing a customer to pay for a purchase with rewards points or may communicate with the alternative payment service provider computer system in real time at the time of purchase. It will be understood that it may be beneficial for an alternative payment service provider to allow a customer to pay with multiple forms of currency, such as cash in various forms (e.g., dollars, euros, pounds, yen), credit, or rewards points. Allowing customers to pay with rewards points may be less expensive for the alternative payment service provider than allowing customers to pay with cash. Also, an alternative payment service provider may gather a great deal of information about its customers' buying habits by allowing many different payment mechanisms, which it may then use to target promotional efforts or sell to merchants.

FIG. 9 depicts an exemplary user interface 200 with the option to pay with rewards points or an account using information previously provided by the customer. For example, the customer may have provided the merchant with account information (e.g., a credit card number and expiration date) and the merchant may have also received rewards program participation data and rewards information. In that way, the merchant may know in advance that a customer has rewards points and an account available to make a purchase and may therefore offer both options. As depicted in FIG. 9, the customer may have, for example, navigated to a web page for a specific book that he or she may desire to purchase. User interface 300 may then display an item description 301, a price 302, a number 303 identifying the specific item, an item image 304, a rewards explanation 305. User interface 300 may also include a rewards points payment input 306 and an account payment input 307. As depicted in FIG. 9, rewards explanation 305 may display: "You currently have 50,000 frequent flyer miles available in your ABC Airline Rewards Account." The customer may then choose to buy the item with 47,500 miles by selecting rewards point payment input 306 or may choose to buy the item with his or her credit card by selecting account payment input 307. Information regarding both choices may be provided by the customer or any other individual or entity with access to such information prior to user interface 300 being displayed, as described herein.

In various exemplary embodiments, rewards program participation information (e.g., the information stored in rewards program participation data 115) and/or rewards information (e.g., the information stored in rewards information data 116) may be provided to the merchant by various computer systems, including rewards program computer system 103 and/or customer computer system 101, as well as other entities, in various ways at various times. The time when rewards program participation information and/or rewards information is provided may depend on the processing speed and/or capacity of rewards program computer system 103 and merchant computer system 102, among other entities. For example, rewards program computer system 103 may provide a daily batch file of BINs and associated rewards information, which merchant computer system 102 may use to populate rewards program participation data 115 and rewards information data 116. The information may also be provided on a real-time "as needed" basis. In various exemplary embodiments, rewards program participation information may be received by merchant computer system 103 in daily batch files and rewards information may be received on an "as needed" basis. Providing rewards program participation information and rewards information will be further described in reference to FIG. 3.

Figure 3:
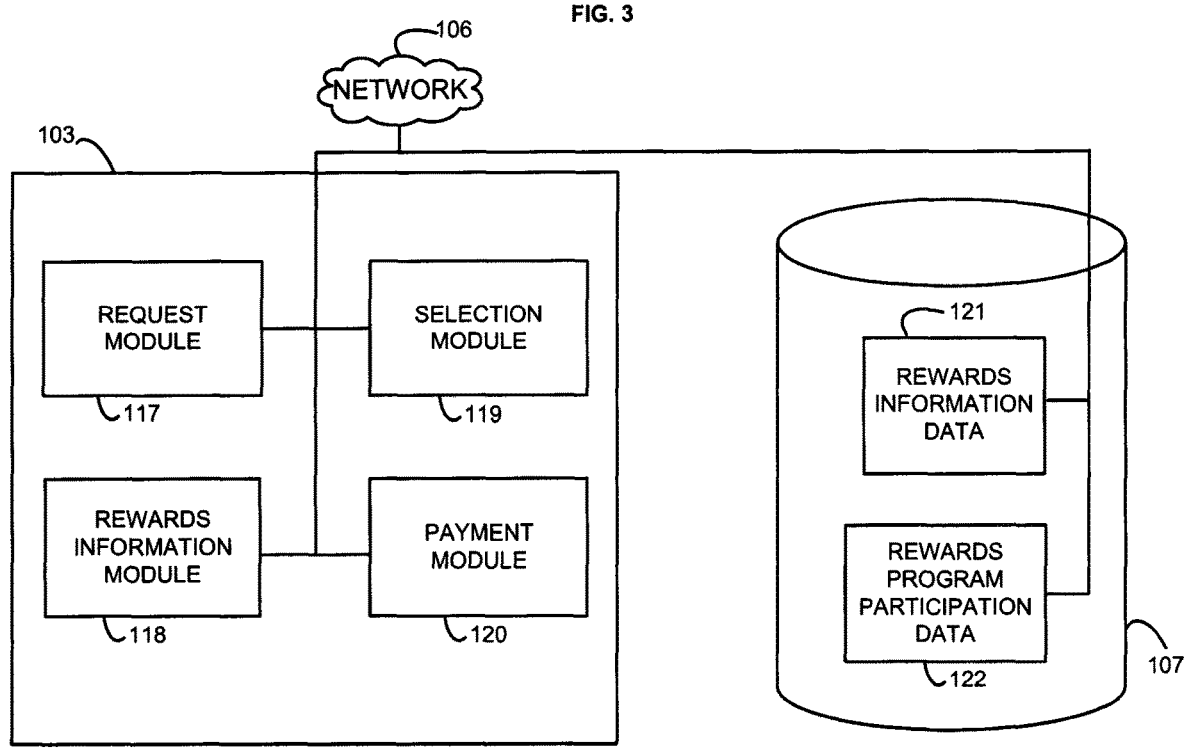
FIG. 3 depicts an exemplary rewards program computer system according to various embodiments of the disclosure.
Figure 4:
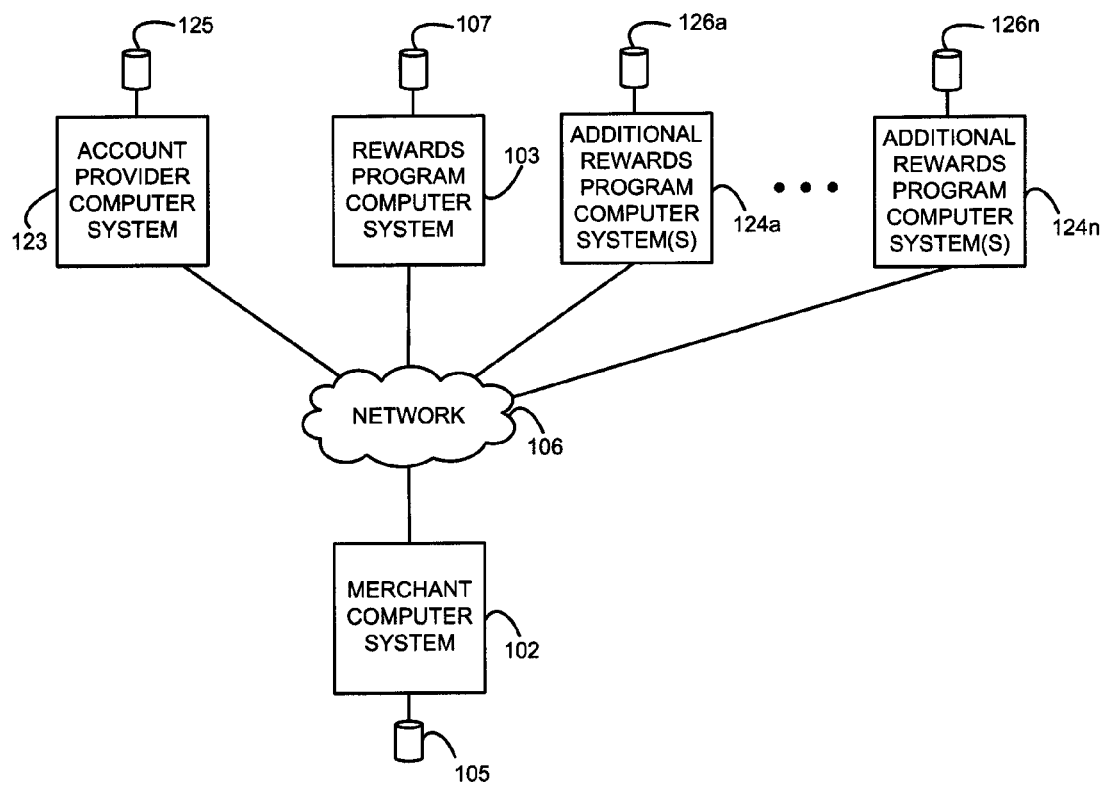
FIG. 4 depicts an exemplary system for performing a purchase transaction using rewards points from multiple accounts and rewards programs according to various embodiments of the disclosure.

FIG. 3 depicts an exemplary rewards program computer system 103 according to various embodiments of the disclosure. Rewards program computer system 103 may include one or more of the following modules: a request module 117, an information module 118, a selection module 119, and a payment module 120. One or more of the modules may electronically communicate with each other and/or other entities via a communication mechanism 121, such as a data communication bus or one or more external networks as defined herein, including network 106. The modules may each be a computer program or an appropriately programmed computer, such as a mainframe or personal computer, or may include a plurality of such computers cooperating to perform the functionality described herein. The modules may also communicate with rewards program storage mechanism 107, which may include rewards information data 121 and rewards program participation data 122, as described herein.

Upon receiving a purchase request from customer computer system 101, merchant computer system 102 may determine the appropriate rewards program provider based on the customer's account identifier (e.g., BIN, customer code, e-mail address) and request rewards program participation information and/or rewards information from rewards program computer system 103. Request module 117 may determine account information for the account provided by the customer by, for example, receiving the BIN for the customer's credit card. Rewards program computer system 103 may then determine whether the provided BIN has an associated rewards program by searching rewards program participation data 122, which may comprise a set of BINs and associated rewards program names or identifiers (e.g., the data described in reference to FIG. 20). As described above, whether the customer has an associated rewards program may be determined by searching rewards program participation data 122 for an identifier associated with a payment type or an identifier associated with the customer. For example, rewards program participation data 122 may be stored by a trusted third party that collects customer information. Rewards program computer system 103 in that case may request the necessary information from that computer system.

If a match is found, rewards program computer system 103 may retrieve rewards information (e.g., the name of the customer's rewards program, the name of the rewards program provider, the number of points accumulated, the cash value equivalent of those points, a conversion ratio for converting between rewards points and cash, and any other information associated with the rewards program) from rewards information data 121 (e.g., the data described in reference to FIG. 21). Information module 118 may provide rewards program participation information and/or rewards information to merchant computer system 102. It will be recognized that rewards information may therefore be provided to the merchant on a real-time or near real-time basis "as needed" upon the merchant receiving a purchase request. Rewards information data 121 and rewards program participation data 107 may be stored in rewards program storage mechanism 107 or may be stored in any other storage mechanism associated with or remote to rewards program computer system 103.

In various exemplary embodiments, the rewards program associated with rewards program computer system 103 may be operated by or associated with the account provider that issued the account initially provided by the customer. It will be recognized, however, that the rewards program may be operated by any other type of entity, including a merchant or independent entity, as well.

Returning to FIG. 2, after the option is provided to the customer to pay for the purchase with an account or rewards points, selection module 119 of merchant computer system 102 may receive a selection from customer computer system 101. For example, the customer's web browser may display two options and the customer may select one or the other by clicking on a corresponding link or button, as depicted in FIG. 8. If merchant computer system 102 determines that the customer decided not to pay for the purchase with rewards points, it may submit the charge for authorization and settlement, provide the desired item to the customer, and receive payment from the account provider. If merchant computer system 102 determines, however, that the customer decided to pay for the purchase with rewards points, it may provide information notifying rewards program computer system 103 that such a selection was made. For example, merchant computer system 102 may notify rewards program computer system 103 of the number of rewards points used or the cash equivalent value of the rewards points used for the purchase. The provided information may allow rewards program computer system 103 to pay for the customer's purchase with rewards points, as described herein. For example, if the customer initially attempted to complete the desired transaction with a credit card but then selected the option instead to pay with rewards points, the customer's credit card may never be charged. Also, merchant computer system 102 may provide other information to rewards program computer system 103, such as any promotions, coupons, discounts, bonuses, or other incentives that were selected by the customer for redeeming his or her rewards points.

Rewards program computer system 103 may then in turn reconcile the transaction by, for example, reducing the number of rewards points available to the customer (e.g., deducting 47,500 frequent flyer miles) and paying the merchant the corresponding cash value of the redeemed points (e.g., $47.50). Various reconciliation mechanisms for paying cash to a merchant will be understood by those of ordinary skill in the art. For example, payment module 120 may cause an ACH credit to be made to the merchant. Payment module 112 of merchant computer system 102 may receive such payment electronically. Also, where an alternative payment service provider, merchant processor, or wireless service provider is used for a purchase, as described herein, rewards program computer system 103 may cause payment to be made to that entity (via an associated computer system, for example), which may then in turn pay the merchant. In that case, the merchant may not know that a customer paid for a transaction using rewards points. Various intermediary accounts may also be used so that the merchant receives payment for a customer's use of rewards points to make a purchase. It will be understood that the merchant associated with merchant computer system 102 (or any other entity that providing goods or services to the customer) may be paid in any way for the rewards points that a customer uses to make a purchase.

Also, if merchant computer system 102 determines that the customer decided to pay for his or her purchase with rewards points, merchant computer system 102 may still submit the charge for authorization and settlement with the account that the customer initially provided but credit the customer for the amount of the charge in various ways. For example, if a credit card number was initially provided for the purchase, the full value of the purchase may be charged to the customer's credit card. Merchant computer system 102, however, may also provide information notifying rewards program computer system 103 (or any other entity) that the customer's account should be credited for that value. Such processing may be beneficial to take advantage of preexisting card transaction processing mechanisms (such as, for example, those described herein in reference to FIG. 6), as well as fraud protection and merchant dispute handling provided by entities involved in card transaction processing.

In various exemplary embodiments, the components described in reference to FIGS. 1 through 6 may perform various procedures to ensure that rewards points are not incorrectly redeemed. For example, two merchant computer systems may receive a daily batch file of BINs and associated rewards information, which informs the merchants that a particular customer has 25,000 rewards points available. The customer may then purchase an item from the first merchant using 25,000 rewards points, but the second merchant may not be aware of the transaction until the next day. If the customer attempted to redeem the same 25,000 points for a purchase from the second merchant, the second merchant may incorrectly allow the transaction to proceed. Such invalid redemption may be avoided, however, by the merchant computer system making "as needed" requests to the rewards program computer system to verify in real time that the rewards points still remain. Also, transactions may not be fully authorized until the next batch file is sent (e.g., a merchant may not actually provide the purchased product until a transaction fully clears). Also, the rewards program provider and merchant may negotiate offline as to the best way to handle invalid rewards points redemptions.

In various exemplary embodiments, the components described in reference to FIGS. 1 through 6 may also perform various procedures to determine whether and how a particular customer should be provided the option to pay for a purchase with rewards points. For example, merchant computer system 102 may only provide the option in limited circumstances where the customer has enough rewards points to pay for the entire purchase or when the customer is a "preferred" customer because he or she has made a certain number of qualifying purchases in the past. Merchant computer system 102 may even completely prevent customers from using rewards points to pay for purchases in certain circumstances or at certain times. Also, merchant computer system 102 may allow a registered customer to "opt out" and not be provided the option to pay with rewards points for his or her purchases. Also, a customer may select various user preferences for the option with merchant computer system 102. For example, a customer may choose to be provided the option only when the purchase is above or below a certain dollar amount.

Also, rewards program computer system 103 (or any other system) may designate certain merchants for offering enhanced value (e.g., rewards points are worth 25% more than usual if redeemed with the particular merchant) or special incentives (e.g., rewards points are worth double during a set of dates near the Christmas holiday) for customers' rewards points. Such information may be communicated to, for example, merchant computer system 102, as described herein. Also, rewards program computer system 103 or merchant computer system 102 may not provide the option to pay with rewards points in the user interface at various times and in certain circumstances (e.g., based on the value of the rewards points at the particular time), but may allow the customer to choose to pay with rewards points by affirmatively selecting a particular option.

It will be understood by those of ordinary skill in the art that any type of promotion, coupon, discount, bonus, other incentive, condition, or restriction may be placed on the option to pay with rewards points by any system, including those depicted in FIGS. 1 through 6, such as rewards program computer system 103 and merchant computer system 102. They may be, for example, time-specific, customer-specific, and/or product-specific. They may also be merchant trade promotions designed to target particular customers based on the customers' buying behavior. For example, if a customer has bought a considerable amount recently from a particular retailer, a rewards program provider may offer an advantageous redemption (e.g., rewards points worth 25% more) if the customer buys in the future from a competitor with which the rewards program provider has a relationship.

As described in further detail in reference to FIG. 4 and FIGS. 10 through 16, a portion of both an account and rewards points may be selected, or rewards points from multiple rewards program providers may be selected, by "splitting" the total amount of the purchase between them and processing each separately. Merchant computer system 102 may in that case provide to the customer the option to pay for a purchase with an account or rewards points, as described herein, and/or with rewards points from multiple rewards program providers and multiple accounts. In reference to FIG. 4, the customer may have selected to pay for a purchase that has a total purchase amount (e.g., $47.50) with an amount from his or her account ($10.00), rewards points from a rewards program to which he or she belongs (e.g., 100 points), and rewards points from another additional rewards program to which he or she belongs (e.g., 17,500 frequent flyer miles). Such partial payment may be particularly beneficial to a customer who has many different rewards programs and/or many different accounts.

The account provider for the customer's account may operate or be associated with an account provider computer system 123 and storage mechanism 125 for storing account information (e.g., amount currently in the customer's checking account, credit limit for a credit card). One or more additional rewards program providers may provide the additional rewards program(s) and operate or be associated with additional rewards program computer system(s) 124*a-n* and corresponding storage mechanism 126*a-n* for storing rewards program participation information and rewards information. The operation of additional rewards program computer system(s) 124*a-n* and storage mechanism 126*a-n* may be similar to that of rewards program computer system 103 and rewards program storage mechanism 107, as described herein. It will also be recognized that more than one account provider computer system may be used as well.

As described herein, merchant computer system 102 may receive a purchase request, determine an account identifier for the customer (by receiving it from the customer or retrieving it from a storage mechanism where the customer has registered an account, for example), provide the option to pay with various accounts and/or rewards points, and receive a corresponding selection of multiple sources from the customer. Merchant computer system 102 may then communicate with the sources via network 106 to complete the purchase transaction. For example, merchant computer system 102 may submit authorization and settlement requests to account provider computer system 123 for $10.00 and may receive payment from the account provider for that amount. Merchant computer system 102 may also retrieve rewards program participation information and rewards information for the rewards programs associated with rewards program computer system 103 and any of additional rewards program computer system(s) 124*a-n*, as described herein, and may notify each of the desired allocation (e.g., 100 points to rewards program computer system 103 and 17,500 frequent flyer miles to additional rewards program computer system 124*a*). The applicable rewards programs may then reduce the customer's accumulated rewards points accordingly and cause payment to be made to the merchant for the cash value corresponding to the rewards points. It will be recognized that although a merchant is described herein in reference to merchant computer system 102, any entity involved in transaction processing may perform the above functionality.

Figure 10:
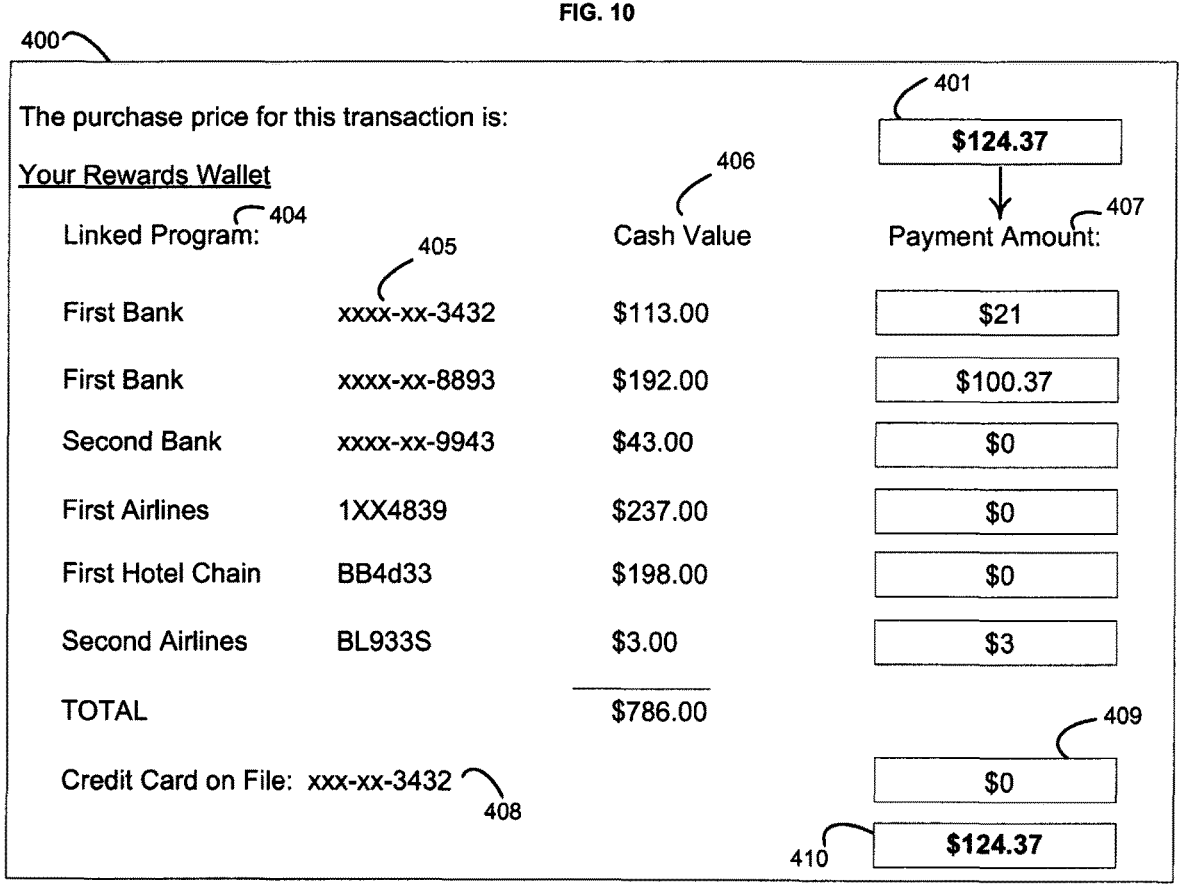
FIG. 10 depicts an exemplary user interface with the option to pay with rewards points from multiple rewards programs displaying cash values of rewards points according to various embodiments of the disclosure.

FIG. 10 depicts an exemplary user interface 400 with the option to pay with rewards points from multiple rewards programs displaying cash values of rewards points according to various embodiments of the disclosure. User interface 400 may comprise a web page or other display and input mechanism, such as, for example, a terminal at a merchant retail location or a screen on a wireless/mobile device. User interface 400 may be displayed after a customer has selected a particular product or service to purchase and may comprise a price display 401 for the total purchase price of the transaction (e.g., $124.37). User interface 400 may also comprise a set of linked program names 404, linked program numbers 405, cash values 406, rewards program payment inputs 407, an account identifier 408, an account input 409, and a total allocated amount 410. Linked program names 404 may comprise the names or titles of various rewards programs to which the customer belongs, such as "First Bank," "First Hotel Chain," "Second Airlines," and the like. Rewards programs and accounts may be "linked" in the sense that the entity providing user interface has information available regarding the customer's rewards program and accounts (e.g., by retrieving it from a storage mechanism, requesting it from a rewards program provider or account provider, or receiving it from the customer previously or at the time of purchase). Linked program numbers 405 may comprise identifiers for the various programs for the customer's convenience. As depicted in FIG. 10, portions of the linked program numbers may be crossed out so that someone else viewing the customer's computer screen does not steal them. Cash values 406 may list the cash value equivalents of the rewards points accumulated in each program. For example, the rewards points accumulated in the "First Airlines" program may be redeemed for $237.00. As described herein, the information regarding the customer's various rewards programs that is displayed on user interface 400 may be retrieved internally based on an account identifier provided by the customer (e.g., a BIN) or may be retrieved externally from the individual rewards program providers or the customer. Account identifier 408 may also identify an account that the customer may use to pay all or a portion of the transaction.

Rewards program payment inputs 407 and account input 409 may be text input boxes for the customer to type in dollar amounts to allocate to each rewards program and/or account to pay for the purchase. As depicted in FIG. 10, the customer may have selected to pay for the $124.37 transaction with $21 worth of rewards points from the first "First Bank" program, $100.37 worth of rewards points from the second "First Bank" program, and $3 worth of frequent flyer miles from the "Second Airlines" program. The total amount currently allocated at the time may be displayed in total allocated amount 410 so that the customer knows how much he or she has allocated so far and how much remains to be allocated. As depicted in FIG. 10, the customer has allocated the full $124.37 amount and may then complete the transaction. Once input is received from the customer, information regarding the customer's selections (e.g., how much was allocated to each rewards program and/or account) may be provided to computer systems associated with the rewards programs and accounts. In various exemplary embodiments, only information necessary to a particular reward program or account may be provided (e.g., "Second Airlines" program would not know that the customer also spent $21 worth of rewards points from the first "First Bank" program). As depicted in FIG. 10, information would be provided to computer systems associated with the "First Bank" and "Second Airlines" programs.

FIG. 11 depicts an exemplary user interface 500 with the option to pay with rewards points from multiple rewards programs displaying rewards points according to various embodiments of the disclosure. User interface 500 may comprise a customer display 501, a set of linked program names 502, a set of linked program numbers 503, points available displays 504, and rewards program payment inputs 505. Customer display 501 may display the customer's name or information regarding his or her accounts or any other information that might be useful to the customer in determining how to make the desired purchase. In contrast to user interface 400 depicted in FIG. 10, user interface 500 may display rewards points (available and allocated) rather than dollar amounts. Doing so may give additional information to the customer and allow him or her to make a better informed decision. For example, as depicted in FIG. 11, the customer may realize that he or she has a small number of rewards points (100 points) available in the first "First Bank" program and may therefore desire to use up all 100 points in the current purchase. User interface 500 may also comprise a total points needed display 506, a total points allocated display 507, and a points needed display 509, which may each dynamically change in response to text entries from the customer into rewards program payment inputs 505. Total points needed display 506 may also correspond to the purchase amount of the transaction. As depicted in FIG. 11, the customer has allocated 500 points so far and may need to allocate 219 more points in order to complete the transaction. As a result, a purchase completion button 508 may be inactive until the total points allocated matches the total points needed.

In various exemplary embodiments, a user interface may display an indication regarding particular rewards points that the customer may want to use immediately for various reasons. For example, if a particular set of rewards points are a few days away from expiring, the user interface displayed to the customer may display a popup window alerting the customer to that fact. Also, if a certain set of rewards points are subject to an annual cap, the user interface may display an indication alerting the customer to that fact as well. Also, if a rewards program provider is currently running a promotion or offering an extra coupon, discount, or other incentive for redeeming rewards points, the user interface may display an indication to alert the customer.

A user interface may also display information for intelligently suggesting to the customer particular redemption strategies, which may be received from a merchant computer system or rewards program computer system or created through processing at the customer computer system where the user interface is displayed. Such redemption strategies may be designed to ensure the maximum benefit for the customer in using his or her rewards points to make purchases. For example, the earn rate for a customer (e.g., the rate at which he or she accumulates points in a rewards program) may change over time based on usage, status (e.g., "silver" or "platinum" rewards programs), or other factors that make it particularly advantageous to redeem or not to redeem certain points. If a customer tends to earn rewards points relatively quickly, it may be beneficial to use those points right away so that the customer does not waste points by reaching a cap imposed by the provider. Conversely, it may be advantageous to keep accumulating rewards points rather than using them so that the customer can make a large purchase (e.g., if there is a minimum number of rewards points that can be redeemed at any particular time). Any computer system described herein may be programmed to take such factors into account and display in the user interface various strategies or suggestions for the best ways to redeem the customer's rewards points. The indication may be in any format, such as, for example, flashing text, color coding, popup alerts, or lists of rewards points ordered from best to worst. The information for providing such redemption strategies may also be received from various entities (e.g., a rewards program provider that may have information regarding the customer's points accumulation tendencies, an account provider that may have information regarding the customer's financial history).

A user interface may also be used for customer contact and promotional purposes. For example, rewards information provided by a rewards program computer system to a merchant computer system for display on a user interface, as described herein, may include promotions, such as special offers, ads, coupons, discounts, or other information. The promotions may be designed to encourage a customer to redeem certain rewards points for various reasons, such as distressed inventory, for example. Also, the user interface may include ads for the rewards programs from which the customer may redeem his or her rewards points. Also, the user interface may include links to the web pages of the various rewards programs or links to locations where the customer may update his or her user profile with the rewards programs. Promotions provided in the user interface may be based on the product or service desired by the customer, the rewards points and accounts available to the customer to pay for the transaction, or any other information associated with the customer. In addition to a rewards program provider, a merchant may also want to include such promotional information in the user interface. For example, a merchant may receive a benefit from a rewards program provider whenever points from the rewards program are redeemed. It may therefore have an incentive to encourage customers to pay for transactions using those points. Also, the user interface may include information regarding a rewards program that may not even be displayed as an option for the customer. For example, the provider of the user interface may make a "smart match" to a known rewards program that the customer may have overlooked by matching customer name or address information stored locally or externally, as described herein. The provider may thereby help customers maximize their redemption of rewards points by locating rewards programs that they might have forgotten they had.

In various exemplary embodiments, allocations between rewards programs and accounts being used to pay for a purchase may interactively change on a user interface in response to customer input into the user interface. Modifying one allocation in response to a change in another may give the customer a better sense of how he or she should use rewards points and accounts to pay for a purchase and may be of great benefit to the customer in making a financial decision. This feature will be described in reference to FIGS. 12 through 15.

FIG. 12 depicts an exemplary user interface 600 with the option to pay with rewards points from multiple rewards programs displaying text rewards points allocations according to various embodiments of the disclosure. User interface 600 may comprise a customer display 601, a total points needed display 602, a set of linked program names 603, a set of linked program numbers 604, points available displays 605, rewards program payment inputs 606, a total points allocated display 607, and a purchase completion button 608. The total points allocated in total points allocated display 607 may remain static at the total points needed (e.g., 12,725 points) in response to input from the user or another entity. In that case, the customer may only change the point amounts in rewards program payment inputs 606. For example, in reference to FIG. 12, the customer may have initially chosen to use 1,000 points from the "First Bank" program and 11,725 points from the "Second Bank" program for a total of 12,725 points.

FIG. 13 depicts user interface 600 after the customer modified one of the point amounts in rewards program payment inputs 606. As depicted in FIG. 13, the customer have increased the allocation from the "First Bank" program from 1,000 points to 5,000 points. User interface 600 may then have automatically changed the points allocated to the "Second Bank" program from 11,725 points to 6,725 points. To do so, the computer system providing user interface 600 may have performed a calculation to determine that because the first allocation increased by 4,000 points, the second allocation should correspondingly be decreased by 4,000 points so that the total remains the same. More complicated calculations and rewards points-to-cash conversions may also be performed as well. Dynamically changing allocations in response to input from the customer may give the customer a better sense of how he or she should use rewards points and accounts to pay for a purchase and may be of great benefit to the customer in making a financial decision. Also, the entity providing user interface 600 may provide an initial "preferred" allocation based on preferences set by the customer or based on a formula to determine an optimal allocation (e.g., using rewards points from the program with the least number of points first, using rewards points that have the best conversion ratio for the current transaction or merchant). Also, the amounts displayed in user interface 600 may be dollar amounts or any other amounts rather than rewards points, as described in reference to FIG. 10, for example.

FIG. 14 depicts an exemplary user interface 700 with the option to pay with rewards points from multiple rewards programs displaying visual rewards points and account allocations according to various embodiments of the disclosure. User interface 700 may display a more complex series of rewards programs and accounts to be used in paying for a purchase. For example, the customer may have a large number of rewards programs and accounts and may benefit from an easy to use interactive user interface for allocating between them. Rather than inputting text of dollar amounts or point amounts, it may be advantageous for the customer to operate an interactive visual display whereby the results of changing one allocation can be easily viewed in the other allocations. User interface 700 may comprise a customer display 701, a set of linked program names 702, a set of linked program numbers 703, a minimum value displays 710, selection mechanisms 704, maximum value displays 711, allocation displays 712, a total purchase price display 709, and a purchase completion button 713. Each minimum value display 710 may correspond to the least amount of rewards points or cash value that may be used to help pay for the desired purchase (e.g., zero points for "First Bank" program, $0.00 for the customer's credit card). Each maximum value display 711 may correspond to the greatest amount of rewards points or cash value that may be used to help pay for the desired purchase (e.g., 12,000 points for "First Bank" program, $247.52 for the customer's credit card). In various exemplary embodiments, the minimum value for a particular rewards program may be the least amount that is redeemable in the current transaction, while the maximum value for a particular rewards program may be the total amount of rewards points that that the customer has accumulated. The minimum and maximum values may also be subject to restrictions and conditions, as described herein, which may be displayed on user interface 700 in the form of a popup window or other display (e.g., notifying the customer that a particular set of rewards points will expire on a certain date). Also, the maximum value for a particular account may be the dollar amount currently available or the customer's credit limit.

Each selection mechanism 704 may comprise a mechanism for the customer to select on user interface 700 an amount of rewards points or cash value within a defined range. Each selection mechanism 704 may comprise a range indicator, such as range indicator 706, and a value selector, such as value selector 705. Range indicator 706 may correspond to the minimum and maximum values for the particular rewards program and may be appropriately sized and shaped to give the customer an accurate representation (e.g., a range of 1000 points may appear larger than a range of 100 points). Value selector 705 may be positioned to correspond to the currently selected amount of rewards points or cash value for the particular program and may be moved within the range of range indicator 706 to select a different value. For example, the customer may drag and drop value selector 705 with a computer mouse or finger on a touch screen or the customer may also use left and right arrow keys on a keyboard. As depicted in FIG. 13, for instance, the customer may have moved value selector 705 for the "First Bank" program all the way to the minimum position corresponding to zero points to be allocated and may have moved value selector 705 for the "First Airlines" program all the way to the maximum position corresponding to 17 frequent flyer miles. The currently selected amount of rewards points or cash value for a particular program or account may be displayed in allocation display 712. Also, other types of selection mechanisms may be used as well.

Figure 15:
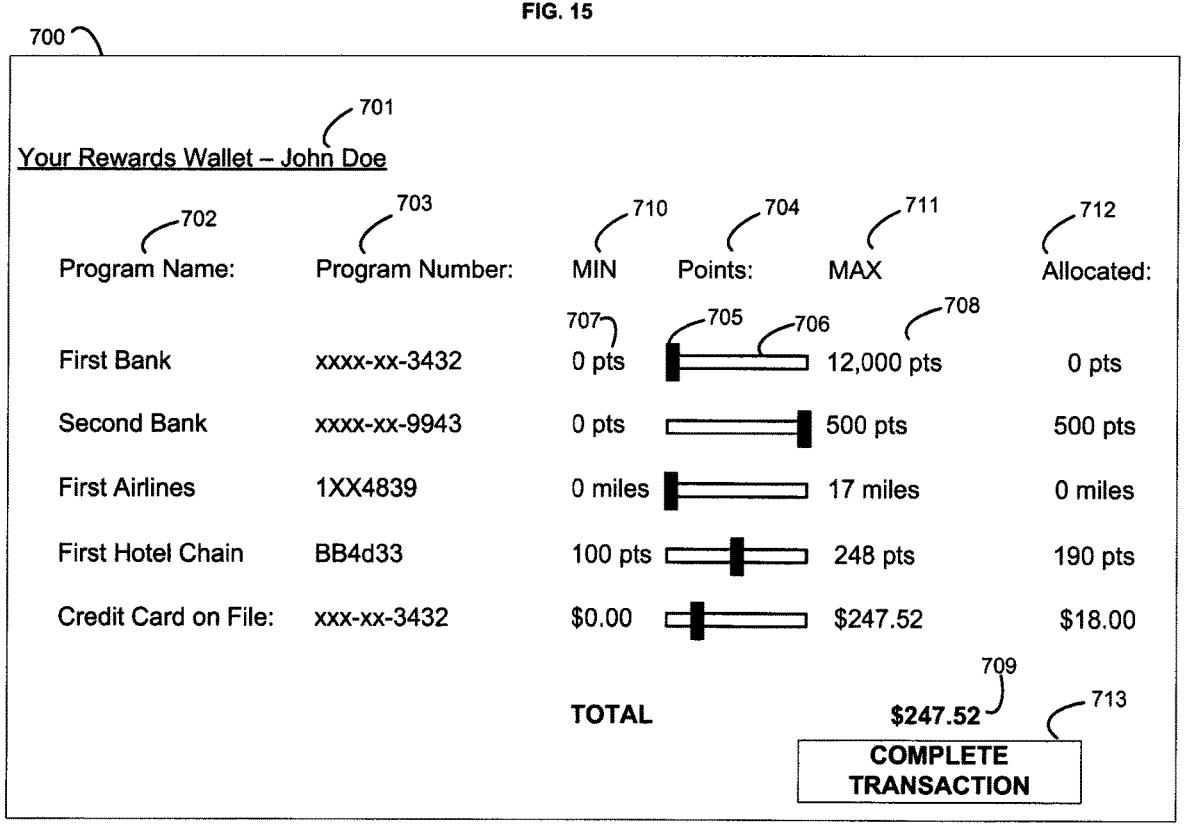
FIG. 15 depicts an exemplary user interface with the option to pay with rewards points from multiple rewards programs displaying visual rewards points and account allocations according to various embodiments of the disclosure.

FIG. 15 depicts user interface 700 after one of the allocations was changed. For example, the customer may have decided for various reasons not to use his or her frequent flyer miles in the "First Airlines" program and therefore reduced the allocation to that program to zero miles. Upon receiving data indicating the change from the customer's computer system, the entity providing user interface 700 may have caused two other allocations to be changed so that the total value remains the same, i.e., at the purchase price. Specifically, the allocation from the "Second Bank" program may have changed from 100 points to 500 points and the allocation from the customer's credit card may have increased from $0.00 to $18.00. The particular changes made may be determined based on customer preferences, optimal allocations, or any other formula or procedure for making allocations dynamically.

Figure 16:
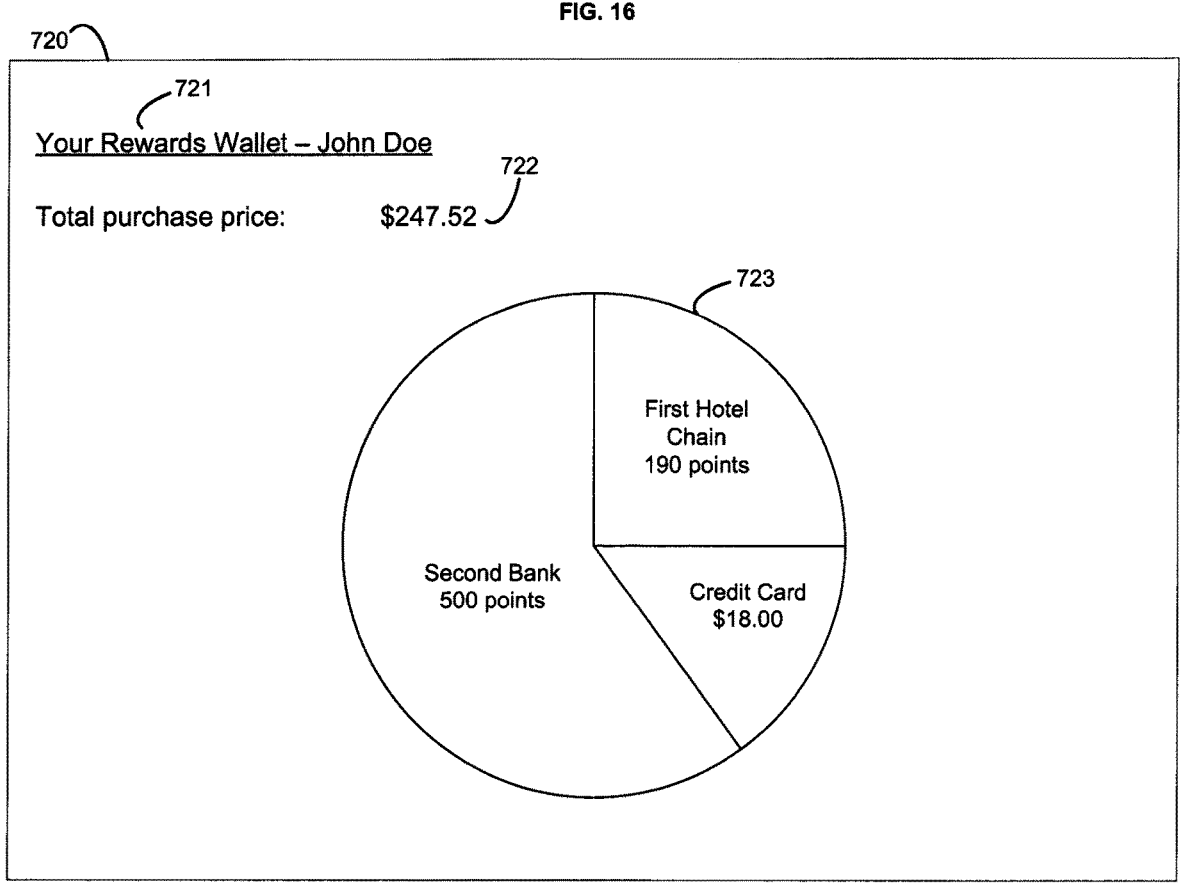
FIG. 16 depicts an exemplary user interface with the option to pay with rewards points from multiple rewards programs displaying pie chart allocations according to various embodiments of the disclosure.

FIG. 16 depicts an exemplary user interface 800 with the option to pay with rewards points from multiple rewards points displaying pie chart allocations according to various embodiments of the disclosure. User interface 800 may comprise a customer display 801, total purchase price display 802, and allocation display 803. Allocation display 803 may comprise a visual display, such as a pie chart, of the various percentage of rewards program and account allocations (e.g., how much each contributes to 100% of the purchase price). As depicted in FIG. 16, 500 points from the "Second Bank" program contribute 62.5% of the purchase price, 190 points from the "First Hotel Chain" program contribute 25% of the purchase price, and $18.00 from the customer's credit card contributes 12.5% of the purchase price. The allocations displayed on user interface 800 may be moved and changed interactively by the customer (e.g., by dragging and dropping portions of a pie chart with a computer mouse or touchpad) and may dynamically change in response to customer input, as described herein.

Figure 5:
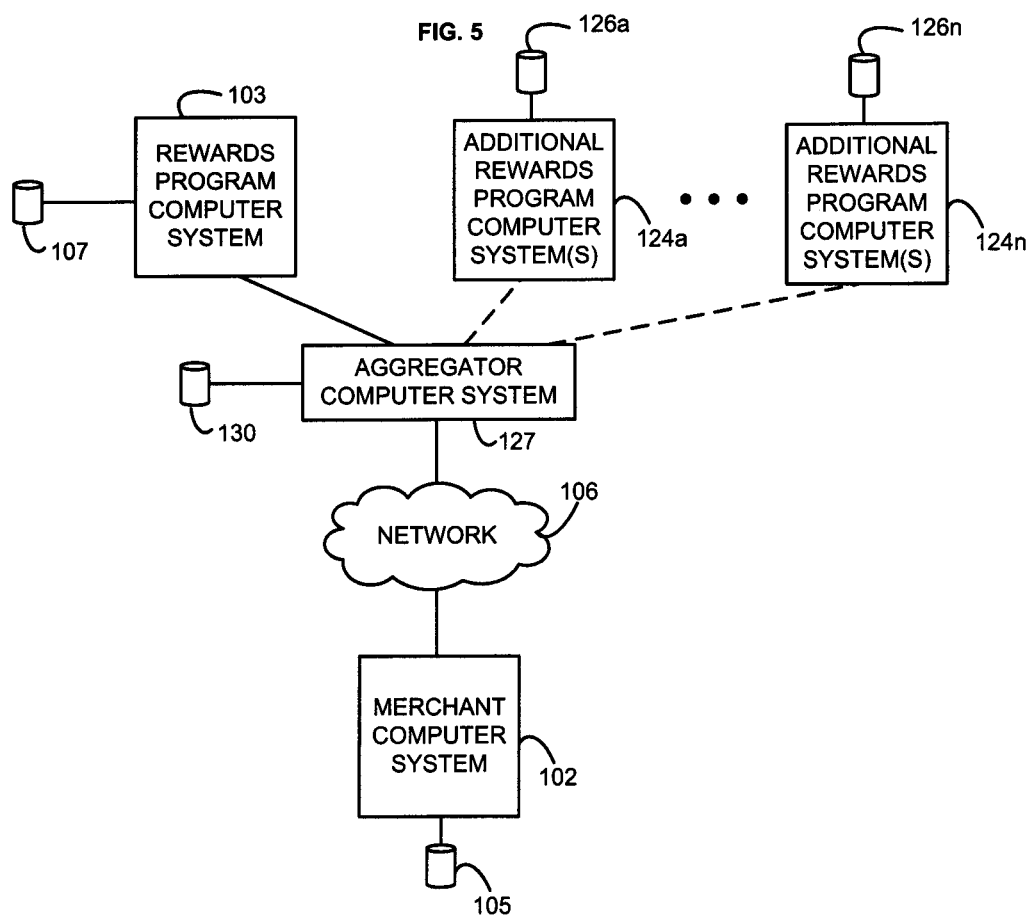
FIG. 5 depicts an exemplary system for performing a purchase transaction using rewards points utilizing an aggregator computer system according to various embodiments of the disclosure.

In various exemplary embodiments, a particular computer system may collect and provide rewards information for a plurality of rewards programs. In reference to FIG. 5, merchant computer system 102 may have received a purchase request and may provide information associated with the request to an aggregator computer system 127 via network 106. The information may comprise, for example, one or more BINs or rewards program identifiers provided by the customer. Based on the information received from merchant computer system 102, aggregator computer system 127 may communicate with various rewards programs and/or account providers to retrieve rewards information for providing the customer with the option to pay for the purchase with various rewards points and accounts. For example, a BIN corresponding to a customer credit card may be received. The corresponding customer may have registered a number of rewards programs and other accounts with aggregator computer system 127 and provided instructions to make such programs and accounts available in the future. Such instructions may be provided via a web page operated by a server of aggregator computer system 127. Aggregator computer system 127 may also store information received from a customer or any other entity in a storage mechanism 130. Also, aggregator computer system 127 may determine based on a particular BIN provided by merchant computer system 102 what rewards program computer system should be contacted regarding the purchase request. As depicted in FIG. 5, aggregator computer system 127 may communicate with rewards program computer system 103 when a certain BIN is received, but may communicate with one or more additional rewards program computer system(s) 124a-n when different BINs is received. Also, a plurality of BINs or other identifiers may be provided by merchant computer system 102 and aggregator computer system 127 may contact each associated rewards program provider or account provider on behalf of the merchant. Also, aggregator computer system 127 may be independent or may itself be associated with a rewards program in which the customer may accumulate rewards points. Also, utilizing the aggregator computer system 127 described in reference to FIG. 5 may be advantageous because the aggregator entity may negotiate favorable conversion rates for its customers with a plurality of rewards program providers.

Also, aggregator computer system 127 may receive a customer selection of amounts and/or rewards points from merchant computer system 102, as described herein. Aggregator computer system 127 may then communicate with the rewards programs and account providers that were selected to help pay for the purchase amount. For example, aggregator computer system 127 may submit authorization and settlement requests for a credit card portion to an account provider and may provide information to rewards programs to reduce the customer's rewards points accordingly and cause payment to be made to the corresponding merchant for the points.

It will be understood by those of ordinary skill in the art that it may be beneficial to a rewards program provider to participate in such a system for performing a purchase transaction using rewards points, as described herein. An aggregator entity may provide an arbitrage opportunity for a rewards program provider to lower the average cost of redemptions. For example, a credit account provider may operate a frequent flyer miles rewards program. If a customer chooses to redeem his or her miles with the credit account provider for a free airline ticket, the average cost to the provider may be 80 basis points (i.e., 0.8% of the accumulating transaction amount). If, however, the customer redeemed the same miles for cash, the cost to the provider may be only 50 basis points. The credit account provider may therefore pay the aggregator (or any other entity offering the customer a choice between rewards programs) 60 basis points to help move the average cost away from 80 basis points. The aggregator may then even pay the merchant 2 basis points as an incentive and keep the 8 basis points difference as profit. The aggregator may also make money by charging a subscription fee to customers using the service (e.g., upfront, based on usage, at end of year), charging customers a fee for converting rewards points to cash, or "rounding up" rewards points redemptions (e.g., 37,892 points to 38,000 points) and keeping the difference as a usage fee. It will be recognized that any computer system involved in rewards points redemption, not just the aggregator computer system described herein, may perform any of the actions above as well.

In various exemplary embodiments, a merchant computer system may also utilize existing communications mechanisms and processes used in the process of card transaction authorization and settlement to perform a purchase transaction using rewards points. It will be recognized by those skilled in the art that in at least some exemplary financial transactions (e.g., credit card transactions), there may be at least two phases: authorization and settlement. In the authorization phase, a merchant may perform various actions to find out whether a customer's desired transaction is valid (e.g., if the customer has sufficient funds in his or her account or sufficient credit available to make a particular purchase). If the transaction is valid, the merchant may receive payment for the transaction in the settlement phase (e.g., from the customer's account provider).

Figure 6:
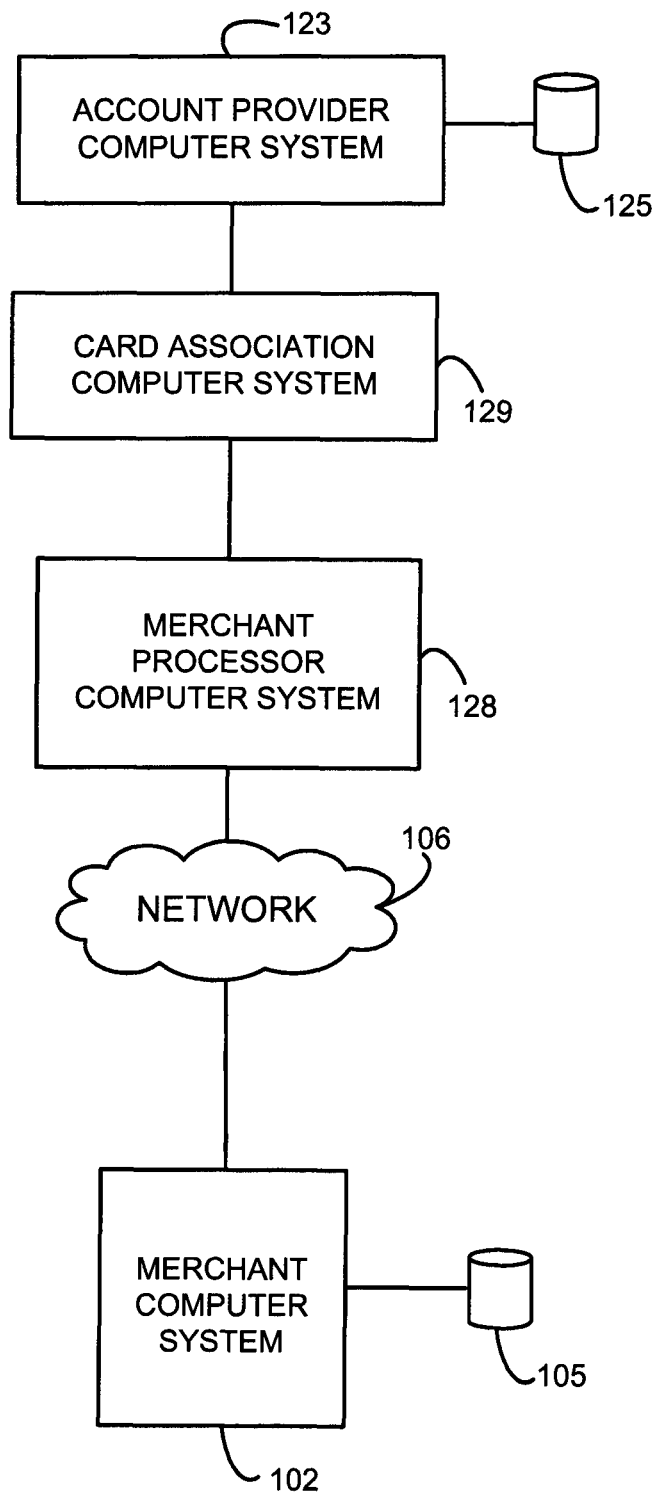
FIG. 6 depicts an exemplary system for performing a purchase transaction using rewards points utilizing card transaction authorization and/or settlement processes according to various embodiments of the disclosure.

In reference to FIG. 6, account provider computer system 123 may be associated with an account provider that provides an account to a customer. The account provider may also offer a rewards program associated with the account (e.g., offering points for purchases made using the account). Account provider computer system 123 may store account information and rewards information in storage mechanism 125, as described herein. Merchant computer system 102 may receive a purchase request comprising an account identifier for an account with the account provider. Merchant computer system 102 may then begin the process of attempting to authorize the desired transaction by providing an authorization request to merchant processor computer system 128. The authorization request may include, for example, information associated with the amount of the desired transaction, the account identifier used for the transaction (e.g., credit card number including a BIN), information associated with the requesting merchant, information associated with the product(s) or service(s) being purchased (e.g., product names or identifiers), and/or any other information associated with the customer, the merchant, or the transaction. In various exemplary embodiments, merchant computer system 102 may transmit the authorization request to merchant processor computer system 128 electronically over one or more networks, including network 106.

In various exemplary embodiments, merchant processor computer system 128 may have a predefined relationship, agreement, or arrangement with the merchant associated with merchant computer system 102 to authorize and settle card transactions on behalf of the merchant. Merchant processor computer system 128 may process transactions for a plurality of merchants and a plurality of customers. For example, TSYS Acquiring Solutions, LLC (TSYS), which those skilled in the art will recognize as an entity that authorizes and settles card transactions, may operate as the merchant processor.

Merchant processor computer system 128 may provide the authorization request, or any other authorization data, to card association computer system 129 associated with the account identifier of the customer. Card association computer system 129 may be associated with a card association that administers cards and acts as a gateway between an account provider and a merchant from which a customer desires to make a purchase. Exemplary card associations may include, without limitation, Visa® and MasterCard®. For example, if the customer attempted to pay for a purchase with a Visa® credit card, the authorization request may be routed to Visa®. If the customer attempted to pay for a purchase with a MasterCard® credit card, the authorization request may be routed to MasterCard®. Card association computer system 129 may perform various actions to verify that the desired transaction may be completed and provide the authorization request, or any other authorization data, to account provider computer system 123, which issued the customer's card. For example, if the customer obtained his or her card from a bank, that bank may act as the account provider. Account provider computer system 123 may perform various actions to verify that the desired transaction may be completed and may also determine that the customer has rewards points available in one or more associated rewards programs. If the customer's account does not have an associated rewards program, account provider computer system 123 may create a well-known authorization message approving or denying the transaction, which may be routed through card association computer system 129, merchant processor computer system 128, and network 106 to merchant computer system 102. It will be understood by those of ordinary skill in the art that the merchant may then complete the transaction with the customer and perform settlement in a similar manner to receive payment for the transaction from the account provider (e.g., weekly batch files for processing, electronic ACH transfers).

If, however, the customer's account has an associated rewards program with rewards points available, account provider computer system 123 may provide a different message with rewards information to be routed to the merchant through the other components depicted in FIG. 6. For example, the message may comprise the name of the customer's rewards program, the name of the rewards program provider, the number of points accumulated, the cash value equivalent of those points, a conversion ratio for converting between rewards points and cash, and any other information associated with the rewards program or accumulated rewards points. Merchant computer system 102 may then, as described herein, use the received information to provide the customer with the option to pay for his or her desired purchase with rewards points or the provided account or both. Communication between merchant computer system 102 and account provider computer system 123 may follow a similar path after the customer has made a selection so that the account provider can reduce the customer's rewards points accordingly and pay the merchant for the cash value equivalent of any redeemed rewards points. Also, communication between merchant computer system 102 and account provider computer system 123 may involve communication with card association computer system 129 and/or merchant processor computer system 128 as in traditional authorization and settlement procedures, as described herein.

It will be recognized that rewards information may be provided by any system with access to such information other than account provider computer system 123, such as card association computer system 129 or merchant processor computer system 128. Also, any system depicted in FIG. 6, for example, may provide the customer with the option to pay for a purchase with rewards points. Also, it will be understood that although only one account provider computer system 123, card association computer system 129, merchant processor computer system 128, and merchant computer system 102 are depicted in FIG. 6, multiple entities of each may communicate in various exemplary embodiments. Also, any system or systems may be substituted in place of the various components depicted in FIG. 6 to utilize other communications mechanisms, processes, and networks to perform a purchase transaction using rewards points. For example, merchant computer system 102 may communicate with other systems via a payment network operated by a wireless service provider (e.g., rather than through merchant processor computer system 128 and card association computer system 129).

It will be also recognized that various entities described in reference to FIG. 6 may charge other entities a fee for using their services. For example, the merchant processor associated with merchant processor computer system 128 may charge the merchant associated with merchant computer system 102 a predetermined percentage for each transaction (e.g., 2%) processed and reduce the amount paid to the merchant accordingly. The merchant processor may also, for example, pay the card association and/or account provider for using their services (e.g., 1.4% interchange fee). Also, any other entities may charge a fee for communicating or routing funds through the charging entity via a network. It will also be recognized that communicating information outside the normal authorization and settlement network in the manner described in reference to FIGS. 1 through 5 may avoid at least some of such fees, particularly interchange fees. Doing so may financially benefit customers attempting to redeem their rewards points and encourage more redemption purchases at merchants.

Figure 17:
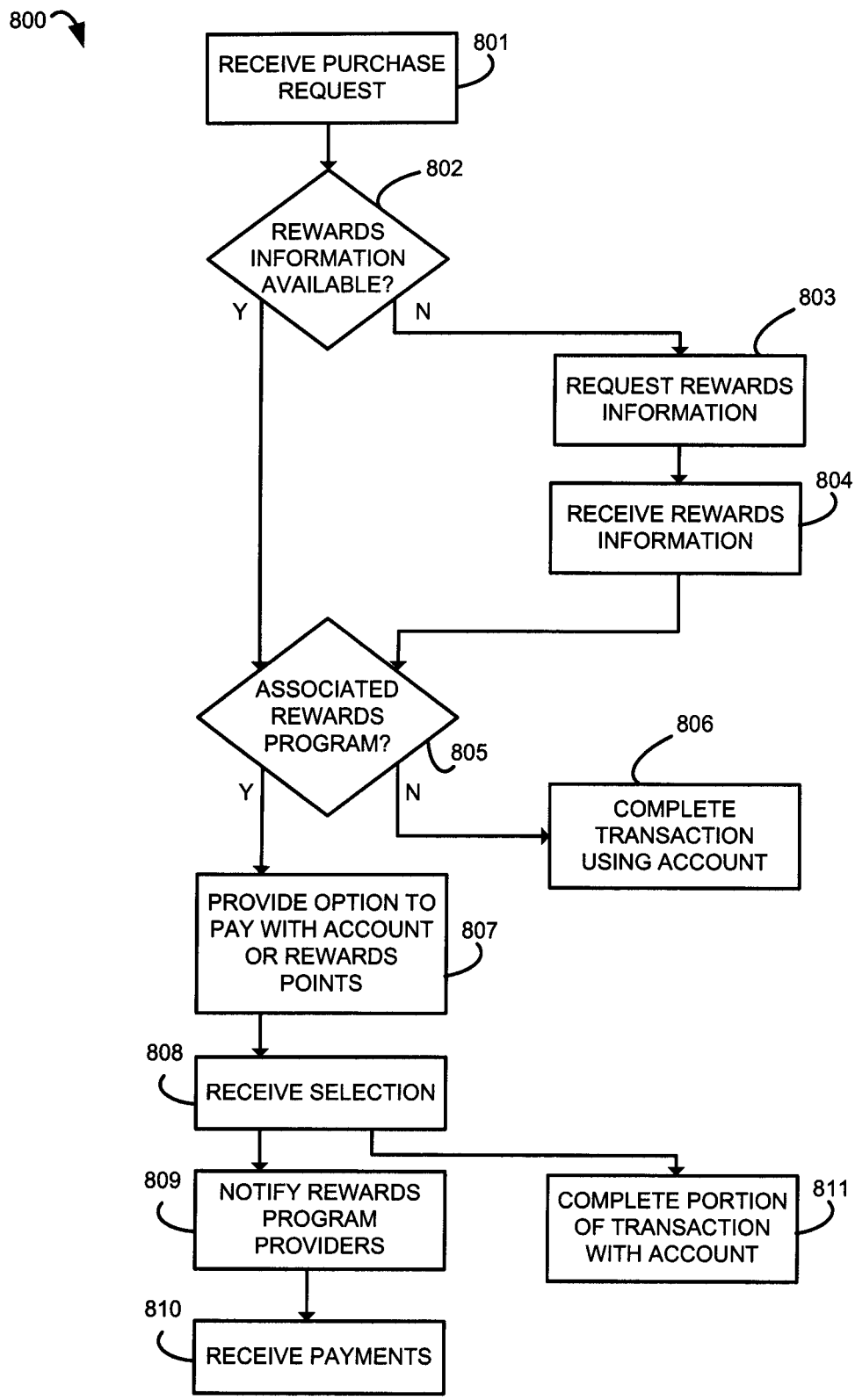
FIG. 17 depicts an exemplary flow chart which illustrates an exemplary method for performing a purchase transaction using rewards points according to various embodiments of the disclosure.

FIG. 17 depicts an exemplary flow chart 800 which illustrates an exemplary method for performing a purchase transaction using rewards points according to various embodiments of the disclosure. At block 801, a computer system, such as a merchant computer system, may receive a purchase request from a customer computer system. The purchase request may be associated with or comprise an account identifier. At block 802, the computer system may determine whether rewards information is available for the provided account by, for example, searching data in a database for the account identifier. If not, the computer system may request rewards information from the rewards program provider (or another entity with access to such information) at block 803. At block 804, rewards information may be received. Once rewards information for the provided account is available, the computer system may determine at block 805 whether there is an associated rewards program with associated rewards points that are redeemable for the desired purchase (e.g., if there are enough rewards points and no restrictions on redemption). If not, the computer system may complete the transaction using the account at block 806 as requested by the customer. If so, the computer system may at block 807 provide the option for the customer to pay for the purchase with the account or with certain rewards points. At block 808, the computer system may receive a selection of one or more rewards programs, one or more accounts, or portions of both. If one or more rewards programs were selected, the computer system may at block 809 notify the corresponding rewards program providers so that they can deduct the appropriate number of rewards points and pay the merchant their corresponding cash value, which may be received at block 810. If one or more accounts were selected, the computer system may at block 811 complete the respective portion of the transaction using the account (e.g., according to well-known authorization and settlement procedures for card transactions).

Figure 18:
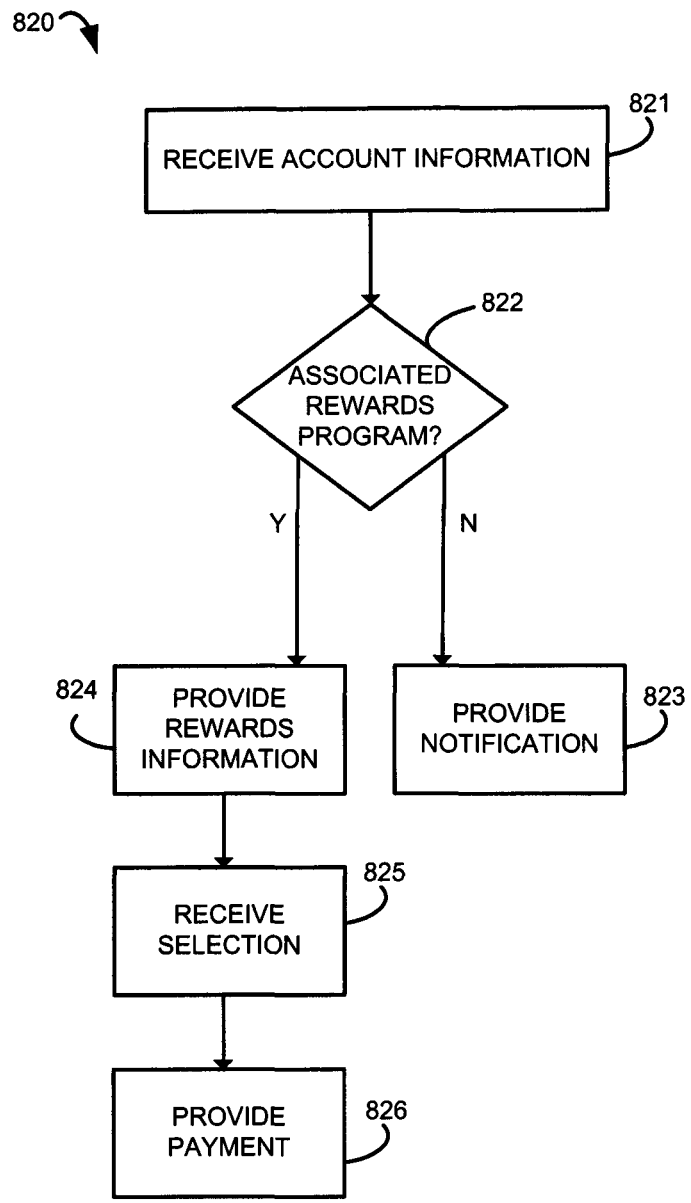
FIG. 18 depicts an exemplary flow chart which illustrates an exemplary method for performing a purchase transaction using rewards points according to various embodiments of the disclosure.

FIG. 18 depicts an exemplary flow chart 820 which illustrates an exemplary method for performing a purchase transaction using rewards points according to various embodiments of the disclosure. At block 821, a computer system, such as a rewards program computer system or account provider computer system, may receive account information for a desired purchase, such as a credit card number. At block 822, the computer system may determine whether the account has an associated rewards program with redeemable rewards points. If so, the computer system may at block 824 provide rewards information to the entity that provided the account information and then receive a selection for payment (e.g., rewards points or account or both) at block 825 and provide payment to the merchant at block 826 for any rewards points that the customer chose to use to pay for the purchase. If not, the computer system may at block 823 notify the entity that provided the account information accordingly.

The present invention may build customer loyalty to rewards program providers that allow rewards points to be easily redeemed using the systems and methods described herein. For example, a customer who is allowed to easily use his or her rewards points to make a purchase from a merchant (even when they could not be otherwise redeemed with the provider directly) may be more likely to conduct future transactions with the provider and/or merchant. A merchant providing its customers with the option to pay with rewards points or an account may also give its customers a significant advantage over other merchants that do not have the same functionality and thereby encourage its customers to make more purchases, which may increase the merchant's business. The present invention also allows rewards points to be efficiently used because small amounts or unwanted portions of rewards points may be redeemed just like currency rather than going to waste.

The embodiments of the present invention are not to be limited in scope by the specific embodiments described herein. For example, a rewards program provider may be any entity with an associated computer system, including, for example, an account provider, card issuer, merchant, or independent entity. Or, communication between the components described herein may be by any communication mechanism and information may be stored in any type of electronic storage mechanism. Or, user interfaces may be in any format. Or, the system for performing a purchase transaction using rewards points may be a collection of more than one computer, each operating collectively as the system. Or, the system may be completely automated such that performing a purchase transaction using rewards points does not require interaction with an operator or a user.

Thus, such modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A system comprising:
one or more processors; and
a memory in communication with the one or more processors and storing instructions that, when executed by the one or more processors, are configured to cause the system to:
receive a request to make a purchase;
determine, based on account information associated with a customer account of a customer, that the customer account is associated with a plurality of rewards accounts each associated with respective rewards points;
receive data comprising specific criteria for determining an allocation of the respective rewards points to be used for the purchase;
determine the allocation of the respective rewards points to be used for the purchase based on the received data;
generate an interactive user display using the determined allocation, the interactive user display configured to:
provide an option to pay for the purchase using the plurality of rewards accounts;
automatically preselect the determined allocation of points of the respective rewards points to be used for the purchase; and
automatically arrange the respective rewards points based on the determined allocation;
transmit for display the interactive user display to a customer device associated with the customer in response to receiving the request to make the purchase;
receive, from the customer device, one or more selections of the respective rewards points to be used for the purchase; and
update the interactive user display to provide updated available respective rewards points based on the one or more selections.

2. The system of claim 1, wherein the account information is received and stored prior to receiving the request, and the account information comprises a multi-character identifier associated with a credit or debit card.

3. The system of claim 1, wherein the request comprises the account information.

4. The system of claim 1, wherein the account information comprises a bank identification number associated with an account provider.

5. The system of claim 1, wherein the instructions are further configured to cause the system to:
receive rewards program participation information comprising an indication that the customer account is associated with a rewards program.

6. The system of claim 5, wherein the rewards program participation information is received from a rewards program provider associated with the rewards program or from the customer.

7. The system of claim 5, wherein the rewards program participation information comprises an indication of an amount of associated first rewards points, an amount of associated second rewards points, an indication of the amount of associated first rewards points corresponding to a total purchase amount, and an indication of the amount of associated second rewards points corresponding to the total purchase amount.

8. The system of claim 1, wherein the interactive user display is further configured to:
provide one or more indications of reasons to use the respective rewards points.

9. The system of claim 8, wherein the reasons comprise one or more of an expiration date, an annual cap, a promotion, an offering, an incentive, or combinations thereof.

10. The system of claim 1, wherein the instructions are further configured to cause the system to:
determine one or more redemption strategies configured to achieve a maximum benefit in using the respective rewards points,
wherein the interactive user display is further configured to:
display the one or more redemption strategies.

11. The system of claim 1, wherein the specific criteria comprise one or more of a spend limit, a spend category, a time restriction, a merchant type, an expiration, a type of purchase, a points threshold, or combinations thereof.

12. The system of claim 1, wherein:
the plurality of rewards accounts comprises a first rewards account with associated first rewards points and a second rewards account with associated second rewards points;
the allocation of the respective rewards points comprises a first allocation of points between a first portion of the first rewards points and a second portion of the second rewards points; and
the interactive user display is further configured to automatically arrange the respective rewards points by arranging the first portion and the second portion based on the determined allocation.

13. A method comprising:
receiving a request to make a purchase;
determining, based on account information associated with a customer account of a customer, that the customer account is associated with a plurality of rewards accounts each associated with respective rewards points;
receiving data comprising specific criteria associated with using the plurality of rewards accounts and the respective rewards points;
determining an allocation of the respective rewards points to be used for the purchase based on the received data;
generating an interactive user display using the determined allocation, the interactive user display configured to:
provide an option to pay for the purchase using the plurality of rewards accounts;
automatically preselect the determined allocation of points of the respective rewards points to be used for the purchase; and
automatically arrange the respective rewards points based on the determined allocation;
transmitting for display the interactive user display to a customer device associated with the customer in response to receiving the request to make the purchase;
receiving, from the customer device, one or more selections of the respective rewards points to be used for the purchase; and updating the interactive user display to provide updated available respective rewards points based on the one or more selections.

14. The method of claim 13, further comprising:
receiving rewards program participation information.

15. The method of claim 14, wherein the rewards program participation information comprises an indication that the customer account is associated with a rewards program.

16. The method of claim 13, wherein the interactive user display is further configured to:
provide one or more indications of reasons to use the respective rewards points.

17. The method of claim 16, wherein the reasons comprise one or more of an expiration date, an annual cap, a promotion, an offering, an incentive, or combinations thereof.

18. The method of claim 13, further comprising:
determining one or more redemption strategies configured to achieve a maximum benefit in using the respective rewards points,
wherein the interactive user display is further configured to:
display the one or more redemption strategies.

19. A system comprising:
one or more processors; and
a memory in communication with the one or more processors and storing instructions that, when executed by the one or more processors, are configured to cause the system to:
receive a request to complete a transaction;
determine that a user account is associated with a plurality of rewards accounts each associated with respective rewards points, the user account associated with a user;
receive data comprising specific criteria for determining an allocation of the respective rewards points to be used for the transaction;
determine the allocation of the respective rewards points to be used for the transaction based on the received data;
generate an interactive user display using the determined allocation, the interactive user display configured to:
provide an option to complete the transaction using the plurality of rewards accounts;
automatically preselect the determined allocation of points of the respective rewards points to be used to complete the transaction; and
automatically arrange the respective rewards points based on the determined allocation;
transmit for display the interactive user display to a user device associated with the user;
receive, from the user device, one or more selections of the respective rewards points to be used to complete the transaction; and
update the interactive user display based on the one or more selections.

20. The system of claim 19, wherein the interactive user display is further configured to:
provide one or more indications of reasons to use the respective rewards points, wherein the reasons comprise one or more of an expiration date, an annual cap, a promotion, an offering, an incentive, or combinations thereof.

* * * * *